US012620538B2

(12) United States Patent
Hotta et al.

(10) Patent No.: US 12,620,538 B2
(45) Date of Patent: May 5, 2026

(54) SWITCH

(71) Applicant: Mitsubishi Electric Corporation, Tokyo (JP)

(72) Inventors: Katsuki Hotta, Tokyo (JP); Shinya Watanabe, Tokyo (JP); Katsuhiko Horinouchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 18/698,369

(22) PCT Filed: Oct. 14, 2022

(86) PCT No.: PCT/JP2022/038412
§ 371 (c)(1),
(2) Date: Apr. 4, 2024

(87) PCT Pub. No.: WO2023/095485
PCT Pub. Date: Jun. 1, 2023

(65) Prior Publication Data

US 2024/0429012 A1 Dec. 26, 2024

(30) Foreign Application Priority Data

Nov. 26, 2021 (JP) ................................ 2021-192248

(51) Int. Cl.
*H01H 50/36* (2006.01)
*H01H 50/54* (2006.01)

(52) U.S. Cl.
CPC ............ *H01H 50/36* (2013.01); *H01H 50/54* (2013.01)

(58) Field of Classification Search
CPC ........ H01H 50/36; H01H 50/54; H01H 9/446; H01H 50/045; H01H 50/163; H01H 50/546; H01H 9/443
See application file for complete search history.

(56) References Cited

U.S. PATENT DOCUMENTS

| | | | |
|---|---|---|---|
| 8,937,518 B2 | 1/2015 | Suzuki et al. | |
| 9,087,655 B2 | 7/2015 | Enomoto et al. | |
| 9,281,148 B2 | 3/2016 | Enomoto | |

FOREIGN PATENT DOCUMENTS

| | | | |
|---|---|---|---|
| EP | 2838100 A1 * | 2/2015 | ............ H01H 50/38 |
| EP | 2980821 A1 | 2/2016 | |

(Continued)

OTHER PUBLICATIONS

International Search Report and Written Opinion mailed on Dec. 20, 2022, received for PCT Application PCT/JP2022/038412, filed on Oct. 14, 2022, 8 pages including English Translation.

*Primary Examiner* — Mohamad A Musleh
(74) *Attorney, Agent, or Firm* — XSENSUS LLP

(57) ABSTRACT

A switch includes: a fixed contact including a fixed contact point; a movable contact including a movable contact point; a magnetic field generating member including a first magnetic pole surface and a second magnetic pole surface; a main yoke including a first connection portion that is connected to the second magnetic pole surface, extends in a third direction from the second magnetic pole surface, and projects to one side and another side in the third direction farther than the magnetic field generating member and the movable contact in the third direction, and an arm portion extending in a second direction from both end portions of the first connection portion along the third direction and disposed on both sides of the magnetic field generating member and the movable contact along the third direction; and an auxiliary yoke directly connected to the first magnetic pole surface.

10 Claims, 15 Drawing Sheets

(56) References Cited

FOREIGN PATENT DOCUMENTS

| | | | | |
|---|---|---|---|---|
| JP | 2010-251542 | A | 11/2010 | |
| JP | 2011-204479 | A | 10/2011 | |
| JP | 2012-054047 | A | 3/2012 | |
| JP | 2012-199118 | A | 10/2012 | |
| JP | 2021-051978 | A | 4/2021 | |
| WO | WO-2012157175 | A1 * | 11/2012 | ........... H01H 50/045 |
| WO | 2014/155874 | A1 | 10/2014 | |
| WO | WO-2021149361 | A1 * | 7/2021 | ............. H01H 50/60 |

* cited by examiner

SWITCH

CROSS-REFERENCE TO RELATED APPLICATIONS

This application is based on PCT filing PCT/JP2022/038412, filed Oct. 14, 2022, which claims priority to Japanese Patent Application No. 2021-192248, filed Nov. 26, 2021, the entire contents of each are incorporated herein by reference.

FIELD

The present disclosure relates to a switch that extends an arc by using an electromagnetic force to extinguish the arc.

BACKGROUND

Conventionally, there has been known a switch that extends an arc by using an electromagnetic force to extinguish the arc. For example, Patent Literature 1 discloses a switch including: a box-shaped case; a fixed contact including a fixed contact point; a movable contact including a movable contact point contactable with and separable from the fixed contact point; a magnet that generates a magnetic field around each contact point; and a yoke that guides a magnetic flux. The fixed contact, the movable contact, the magnet, and the yoke are accommodated in the case. Here, each component of the switch will be described with reference to a height direction, a width direction, and a depth direction of the case.

The movable contact is disposed on the lower side of the fixed contact and is movable in the height direction with respect to the fixed contact. The magnet is disposed apart from the movable contact in the width direction. The yoke includes a main yoke and an auxiliary yoke. The main yoke extends in the depth direction from a surface of the magnet facing a side opposite to the movable contact, and then extends in the width direction until the main yoke is located on both sides of the magnet and the movable contact in the depth direction. The auxiliary yoke is disposed between the movable contact and the magnet.

In the switch disclosed in Patent Literature 1, the main yoke forms a closed magnetic path inside the case. Therefore, an arc generated between the movable contact point and the fixed contact point when the movable contact point is separated from the fixed contact point can be extended in a direction away from each contact point. Further, in the switch disclosed in Patent Literature 1, the auxiliary yoke disposed between the movable contact and the magnet enables the magnetic flux to be guided toward each contact point to increase a magnetic flux density around each contact point, so that the arc can be quickly driven.

CITATION LIST

Patent Literature

Patent Literature 1: Japanese Patent Application Laid-open No. 2021-051978

SUMMARY OF INVENTION

Problem to Be Solved by the Invention

In the switch disclosed in Patent Literature 1, the main yoke can extend the arc in a direction away from each contact point, but an effect of guiding the magnetic flux so as to extend the arc by using the auxiliary yoke has been insufficient because a gap or an insulator exists between a magnetic pole surface of the magnet and the auxiliary yoke.

The present disclosure has been made in view of the above, and an object of the present disclosure is to provide a switch capable of extending an arc longer than conventional technologies.

Means to Solve the Problem

In order to solve the above-stated problems and achieve the object, a switch according to the present disclosure comprises: a fixed contact including a fixed contact point; a movable contact including a movable contact point contactable with the fixed contact point, the movable contact being disposed to be movable in a first direction with respect to the fixed contact; and a magnetic field generating member disposed apart from the movable contact in a second direction orthogonal to the first direction, the magnetic field generating member including a first magnetic pole surface facing the movable contact and a second magnetic pole surface facing a side opposite to the movable contact. Further, a switch according to the present disclosure comprises: a main yoke including a first connection portion and a pair of arm portions, the first connection portion being connected to the second magnetic pole surface, extending from the second magnetic pole surface in a third direction orthogonal to both the first direction and the second direction, and projecting to one side and another side in the third direction farther than each of the magnetic field generating member and the movable contact, and the pair of arm portions extending in the second direction from both end portions of the first connection portion along the third direction and being disposed on both sides of the magnetic field generating member and the movable contact along the third direction; and an auxiliary yoke directly connected to the first magnetic pole surface.

Effects of the Invention

The switch according to the present disclosure has an effect of being able to extend an arc longer than conventional technologies.

DESCRIPTION OF EMBODIMENTS

Hereinafter, a switch according to embodiments will be described in detail with reference to the drawings.

First Embodiment

Figure 1:
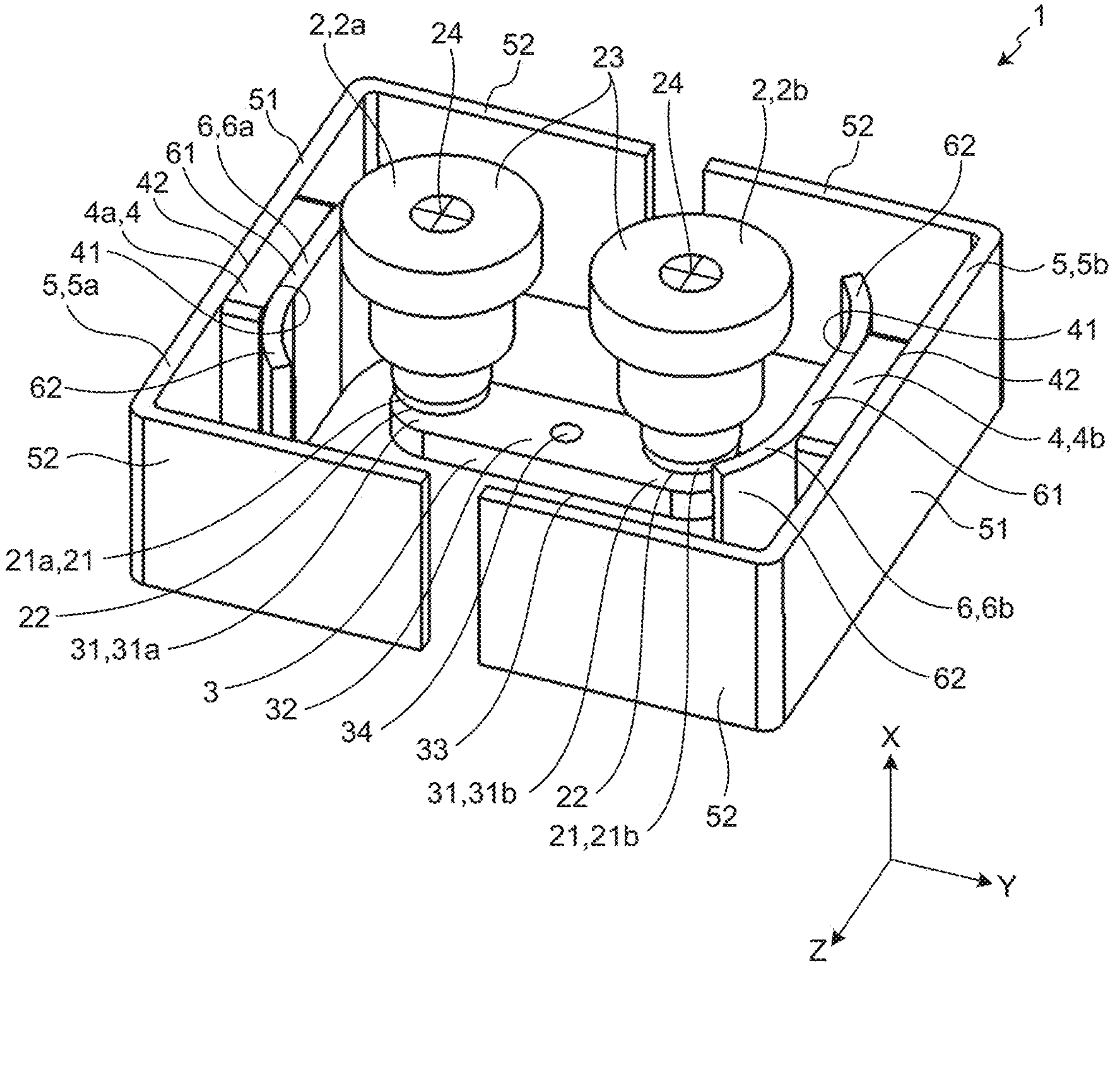
FIG. 1 is a perspective view illustrating a switch according to a first embodiment.
Figure 2:
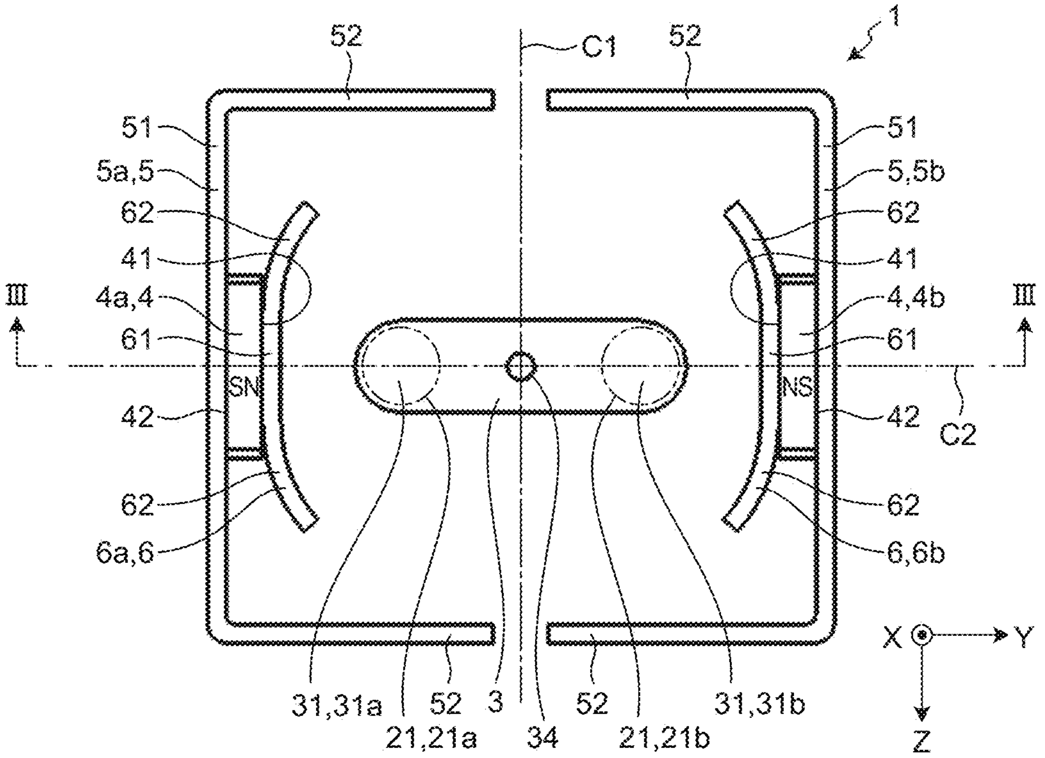
FIG. 2 is a plan view illustrating the switch according to the first embodiment.
Figure 3:
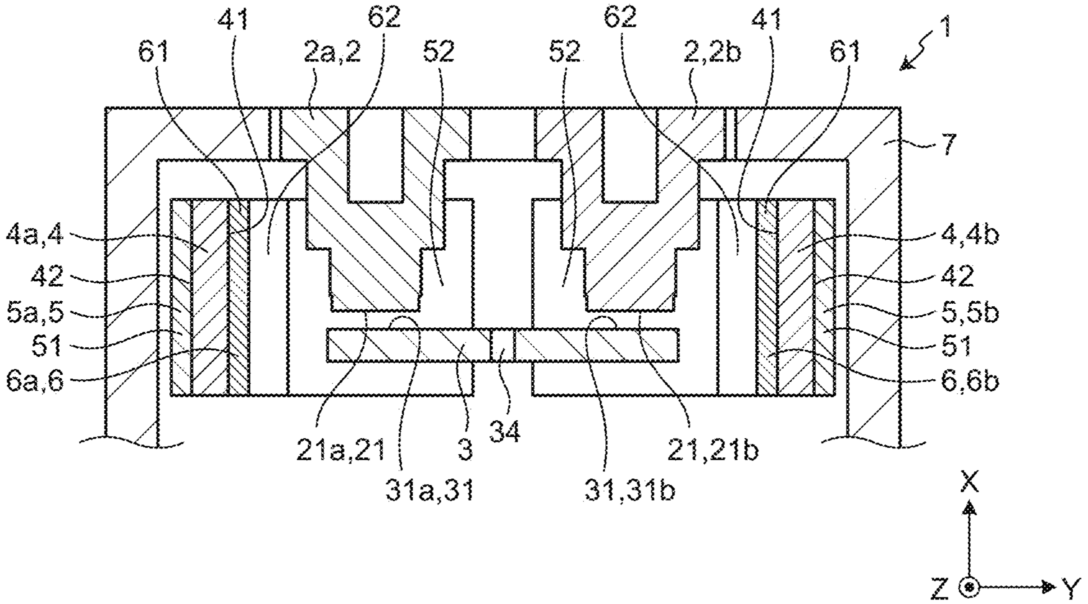
FIG. 3 is a cross-sectional view taken along line III-III illustrated in FIG. 2.

FIG. 1 is a perspective view illustrating a switch 1 according to a first embodiment. FIG. 2 is a plan view illustrating the switch 1 according to the first embodiment. FIG. 3 is a cross-sectional view taken along line III-III illustrated in FIG. 2. In FIG. 2, a fixed contact point 21 is indicated by a two-dot chain line. As illustrated in FIG. 1, the switch 1 includes two fixed contacts 2, one movable contact 3, two magnets 4, two main yokes 5, and two auxiliary yokes 6. The movable contact 3 is disposed to be movable in one direction with respect to the fixed contacts 2.

Hereinafter, when a direction of each component of the switch 1 is described, a direction in which the movable contact 3 is moved is defined as an X-axis direction, a direction orthogonal to the X-axis direction is defined as a Y-axis direction, and a direction orthogonal to both the X-axis direction and the Y-axis direction is defined as a Z-axis direction. Further, a positive direction in the X-axis direction is defined as an upper side, and a negative direction in the X-axis direction is defined as a lower side. The positive direction in the X-axis direction is a direction from the negative side to the positive side of the X-axis, and the negative direction in the X-axis direction is a direction from the positive side to the negative side of the X-axis. Further, a positive direction in the Y-axis direction is defined as a right side, and a negative direction in the Y-axis direction is defined as a left side. The positive direction in the Y-axis direction is a direction from the negative side to the positive side of the Y-axis, and the negative direction in the Y-axis direction is a direction from the positive side to the negative side of the Y-axis. Further, a positive direction in the Z-axis direction is defined as a front side, and a negative direction in the Z-axis direction is defined as a rear side. The positive direction in the Z-axis direction is a direction from the negative side to the positive side of the Z-axis, and the negative direction in the Z-axis direction is a direction from the positive side to the negative side of the Z-axis. In the present embodiment, the X-axis direction is a first direction, the Y-axis direction is a second direction, and the Z-axis direction is a third direction.

The two fixed contacts 2 are disposed apart from each other in the Y-axis direction. The fixed contacts 2 and the movable contact 3 are provided along the X-axis direction. Each fixed contact 2 includes one fixed contact point 21, a fixed-side first surface 22 facing the movable contact 3, a fixed-side second surface 23 facing a side opposite to the movable contact 3, and one terminal screw 24. Hereinafter, the two fixed contacts 2 are referred to as a first fixed contact 2*a* and a second fixed contact 2*b* when being distinguished from each other. Further, the two fixed contact points 21 are referred to as a first fixed contact point 21*a* and a second fixed contact point 21*b* when being distinguished from each other.

The outer shape of the fixed contact 2 is not particularly limited, but is a shape in which circles having different diameters are continuous along the X-axis direction, and the diameter decreases as advancing toward the movable contact 3, in the present embodiment. The fixed contact point 21 is provided on the fixed-side first surface 22. The first fixed contact point 21*a* and the second fixed contact point 21*b* are provided apart from each other along the Y-axis direction. The terminal screw 24 is screwed into a screw hole opened in the fixed-side second surface 23. The terminal screw 24 is a screw for connecting an external terminal (not illustrated).

The movable contact 3 is disposed to be movable in the X-axis direction with respect to the fixed contacts 2. The movable contact 3 is disposed on the lower side of the fixed contacts 2. The shape of the movable contact 3 is not particularly limited, but is a substantially rectangular parallelepiped shape longer in the Y-axis direction than in the Z-axis direction, in the present embodiment. The movable contact 3 includes two movable contact points 31 contactable with and separable from the fixed contact points 21 of the individual fixed contacts 2, a movable-side first surface 32 facing the fixed contacts 2, and a movable-side second surface 33 facing a side opposite to the fixed contacts 2. The movable contact point 31 is provided on the movable-side first surface 32. At the center of the movable contact 3, a through hole 34 penetrating in the X-axis direction is formed. The through hole 34 penetrates the movable contact 3 from the movable-side first surface 32 to the movable-side second surface 33. A shaft (not illustrated) is inserted into the through hole 34. Hereinafter, the two movable contact points 31 are referred to as a first movable contact point 31*a* and a second movable contact point 31*b* when being distinguished from each other.

As illustrated in FIG. 2, the two movable contact points 31 are provided apart from each other in the Y-axis direction. Here, a virtual straight line extending along the Z-axis direction through the through hole 34, which is the center of the movable contact 3, is defined as a first centerline C1. Further, a virtual straight line extending along the Y-axis direction through the through hole 34, which is the center of the movable contact 3, is defined as a second centerline C2. The first movable contact point 31*a* is disposed on the left side, which is one side of the movable contact 3 with respect to the first centerline C1. The first movable contact point 31*a* and the first fixed contact point 21*a* coincide in position with each other in the Y-axis direction and the Z-axis direction. The first movable contact point 31*a* is contactable with and separable from the first fixed contact point 21*a*. The second movable contact point 31*b* is disposed on the right side, which is another side of the movable contact 3 with respect to the first centerline C1. The second movable contact point 31*b* and the second fixed contact point 21*b* coincide in position with each other in the Y-axis direction and the Z-axis direction. The second movable contact point 31*b* is contactable with and separable from the second fixed contact point 21*b*.

Note that the fixed contact point 21 may be formed separately from the fixed contact 2 and connected to the fixed contact 2, or may be formed integrally with the fixed contact 2. Further, the movable contact point 31 may be formed separately from the movable contact 3 and connected to the movable contact 3, or may be formed integrally with the movable contact 3.

The two magnets 4 are disposed apart from each other in the Y-axis direction with the movable contact 3 interposed in between. Hereinafter, the two magnets 4 are referred to as a first magnet 4*a* and a second magnet 4*b* when being distinguished from each other. Each magnet 4 is disposed apart from the movable contact 3 in the Y-axis direction, and serves as a magnetic field generation means that generates a magnetic field around the movable contact point 31 and the fixed contact point 21. The magnet 4 is a permanent magnet, and attracts the main yoke 5 and the auxiliary yoke 6 with a magnetic force. As the magnet 4, for example, a ferrite magnet or a neodymium magnet is used. The magnet 4 is formed in a rectangular parallelepiped shape.

Each magnet 4 includes a first magnetic pole surface 41 facing the movable contact 3 and a second magnetic pole surface 42 facing a side opposite to the movable contact 3. Polarities of the first magnetic pole surfaces 41 of the individual magnets 4 are identical to each other. The polarity of the first magnetic pole surface 41 is an N pole in the present embodiment. Polarities of the second magnetic pole surfaces 42 of the individual magnets 4 are identical to each other. The polarity of the second magnetic pole surface 42 is an S pole in the present embodiment.

The main yokes 5 are magnetic bodies and one main yoke 5 is directly connected to the second magnetic pole surface 42 of each magnet 4. Hereinafter, the two main yokes 5 are referred to as a first main yoke 5*a* and a second main yoke 5*b* when being distinguished from each other. For the main yoke 5, a magnetic material such as electromagnetic soft iron or an electrogalvanized steel plate is used. Each main yoke 5 includes: a first connection portion 51 that is directly connected to the second magnetic pole surface 42, extends in the Z-axis direction from the second magnetic pole surface 42, and projects farther than each of the magnet 4 and the movable contact 3 to one side and another side in the Z-axis direction. Further, each main yoke 5 includes: a pair of arm portions 52 extending in the Y-axis direction from both end portions of the first connection portion 51 along the Z-axis direction, and disposed on both sides of the magnet 4 and the movable contact 3 along the Z-axis direction.

The first connection portion 51 is formed in a plate shape wider than the magnet 4, the auxiliary yoke 6, and the movable contact 3 in the Z-axis direction. The first connection portion 51 is disposed at a position overlapping with the magnet 4, the auxiliary yoke 6, and the movable contact 3 in the X-axis direction and the Z-axis direction.

The arm portion 52 is formed in a plate shape having a plate thickness identical to that of the first connection portion 51. The arm portion 52 is disposed apart from the magnet 4, the auxiliary yoke 6, and the movable contact 3 in the Z-axis direction, at a position overlapping with the magnet 4, the auxiliary yoke 6, and the movable contact 3 in the X-axis direction and the Y-axis direction. The arm portion 52 of the first main yoke 5*a* is provided at a position overlapping, in the X-axis direction and the Y-axis direction, with the first magnet 4*a*, a first auxiliary yoke 6*a* to be described later, and a portion of the movable contact 3 on the left side of the first centerline C1. The arm portion 52 of the second main yoke 5*b* is provided at a position overlapping, in the X-axis direction and the Y-axis direction, with the second magnet 4*b*, a second auxiliary yoke 6*b* to be described later, and a portion of the movable contact 3 on the right side of the first centerline C1. The arm portion 52 of the first main yoke 5*a* and the arm portion 52 of the second main yoke 5*b* coincide in position with each other in the Z-axis direction. A gap is provided between a distal end portion of the arm portion 52 of the first main yoke 5*a* and a distal end portion of the arm portion 52 of the second main yoke 5*b*.

The auxiliary yokes 6 are magnetic bodies and one auxiliary yoke 6 is directly connected to the first magnetic pole surface 41 of each magnet 4. Hereinafter, the two auxiliary yokes 6 are referred to as the first auxiliary yoke 6*a* and the second auxiliary yoke 6*b* when being distinguished from each other. For the auxiliary yoke 6, a magnetic material such as electromagnetic soft iron or an electrogalvanized steel plate is used. The auxiliary yoke 6 is disposed between the magnet 4 and the movable contact 3. The auxiliary yoke 6 is disposed apart from the movable contact 3 in the Y-axis direction. Each auxiliary yoke 6 is formed in a plate shape wider than the first magnetic pole surface 41 in the Z-axis direction. The plate thickness of the main yoke 5 and the plate thickness of the auxiliary yoke 6 are identical to each other in the present embodiment.

Each auxiliary yoke 6 includes a second connection portion 61 directly connected to the first magnetic pole surface 41. Further, each auxiliary yoke 6 includes: a pair of extending portions 62 extending farther than the first magnetic pole surface 41 in the Z-axis direction from both end portions of the second connection portion 61 along the Z-axis direction, and extending so as to approach the movable contact 3 as advancing away from the second connection portion 61. Each extending portion 62 projects farther than the first magnetic pole surface 41 toward one side and another side in the Z-axis direction. Each extending portion 62 extends in a curved shape so as to approach the movable contact 3 as advancing toward the arm portion 52 from the first magnetic pole surface 41. Note that, each extending portion 62 may extend linearly so as to approach the movable contact 3 as advancing toward the arm portion 52 from the first magnetic pole surface 41.

As illustrated in FIG. 3, the switch 1 includes a case 7. The case 7 is a resin or metal member that accommodates the fixed contacts 2, the movable contact 3, the magnets 4, the main yokes 5, and the auxiliary yokes 6. Although not illustrated, a member such as a shaft, a spring, and a coil necessary for moving the movable contact 3 is disposed on the lower side of the movable contact 3, and the case 7 is formed in a hollow box shape that also accommodates the shaft and the like.

In a non-energized state in which the coil is not energized, the movable contact 3 is biased in a direction away from the fixed contacts 2 by a spring force of the spring, each movable contact point 31 is separated from a corresponding fixed contact point 21, and each movable contact point 31 and the corresponding fixed contact point 21 are electrically interrupted from each other. Whereas, in an energized state in which the coil is energized, the movable contact 3 is moved toward the fixed contacts 2 against the spring force of the spring with a magnetic force generated from the coil, each movable contact point 31 comes into contact with a corresponding fixed contact point 21, and each movable contact point 31 and the corresponding fixed contact point 21 are electrically conducted with each other. Then, when the state transitions from the conduction state to the interrupted state and each movable contact point 31 is separated from the corresponding fixed contact point 21, high-temperature arc discharge occurs between each movable contact point 31 and the corresponding fixed contact point 21 in accordance with circuit conditions. Hereinafter, the arc discharge is referred to as an arc.

Figure 4:
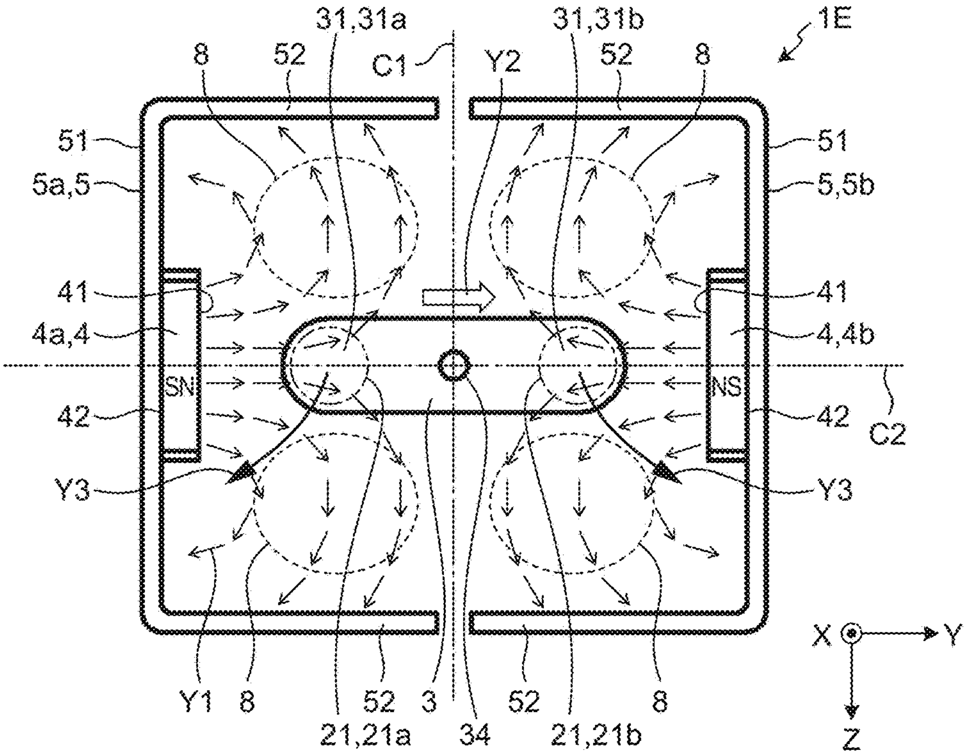
FIG. 4 is a plan view for explaining an effect of a switch according to a comparative example.
Figure 5:
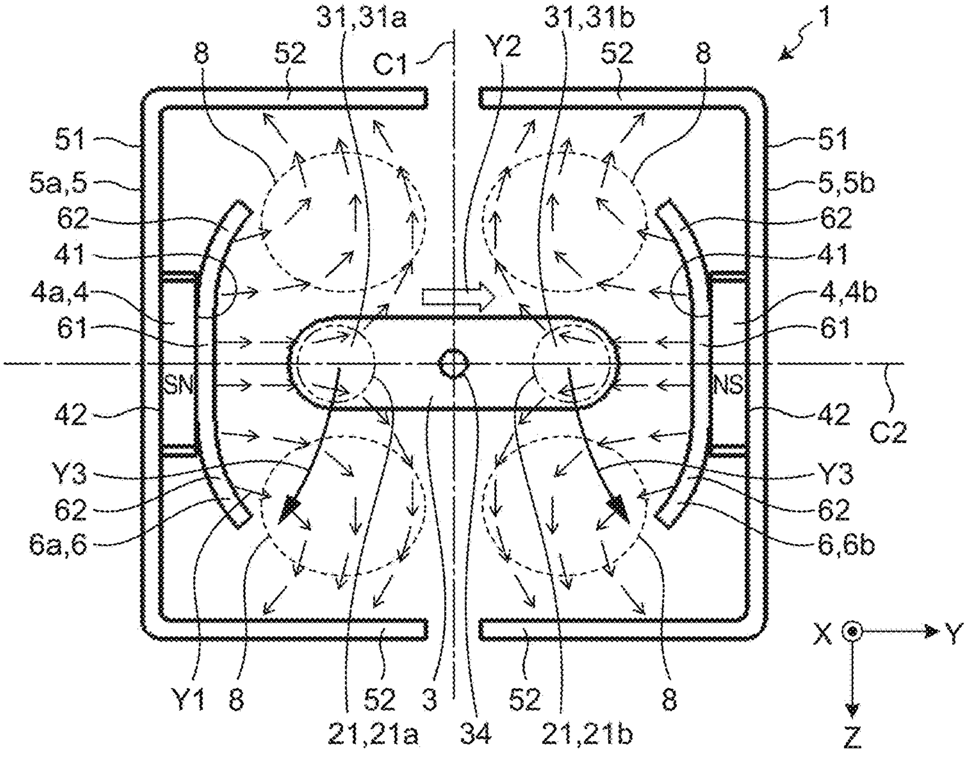
FIG. 5 is a plan view for explaining an effect of the switch according to the first embodiment.

Next, with reference to FIGS. 4 and 5, an effect of the switch 1 according to the present embodiment will be described. FIG. 4 is a plan view for explaining an effect of a switch 1E according to a comparative example. FIG. 5 is a plan view for explaining an effect of the switch 1 according to the first embodiment. The switch 1 according to the present embodiment illustrated in FIG. 5 includes the auxiliary yoke 6, whereas the switch 1E according to the comparative example illustrated in FIG. 4 does not include the auxiliary yoke 6. An arrow Y1, an arrow Y2, and an arrow Y3 illustrated in FIGS. 4 and 5 respectively indicate a direction in which a magnetic flux flows, a direction in which a current flows through the movable contact 3, and a driving direction of an arc.

Further, in FIGS. 4 and 5, an arc extinguishing space 8 in which the arc is extinguished is schematically illustrated by an elliptical broken line. The arc extinguishing space 8 is a space between the movable contact 3 and the arm portion 52, in which the arc can be extinguished by extending the arc up to the space. The arc extinguishing spaces 8 exist, one between the movable contact 3 and each arm portion 52 of the first main yoke 5*a*, and the arc extinguishing spaces 8 exist, one between the movable contact 3 and each arm portion 52 of the second main yoke 5*b*.

Here, it is assumed that a direction of a current flowing through the movable contact 3 is a direction along the Y-axis direction from the first magnet 4*a* toward the second magnet 4*b*, and polarities of the first magnetic pole surfaces 41 of the magnets 4 are identical polarities of the N pole. In such a case, in each of the switches 1 and 1E, a magnetic flux generated from the magnet 4 flows toward the movable contact 3 and then toward the main yoke 5, and a magnetic field generated by the first magnet 4*a* and a magnetic field generated by the second magnet 4*b* are symmetrical about the first centerline C1 as a boundary. Then, since the Lorentz force in the direction of the arrow Y3 acts on an arc, the arc is driven along the direction of the arrow Y3. Specifically, an arc generated between the first movable contact point 31*a* and the first fixed contact point 21*a* is driven toward the left and front side with respect to the movable contact 3. Whereas, an arc generated between the second movable contact point 31*b* and the second fixed contact point 21*b* is driven toward the right and front side with respect to the movable contact 3.

In the switch 1E according to the comparative example illustrated in FIG. 4, the magnetic flux generated from the magnet 4 closes in a short path as compared with the switch 1 according to the present embodiment including the auxiliary yoke 6. Therefore, the magnetic flux density in the arc extinguishing space 8 is reduced, and the effect of extending the arc long is deteriorated.

In this regard, in the present embodiment illustrated in FIG. 5, since the switch 1 includes the auxiliary yokes 6 directly connected to the first magnetic pole surfaces 41 of the magnets 4, the magnetic flux guided to the arc extinguishing space 8 increases, and the magnetic flux density of the arc extinguishing space 8 can be increased, as compared with the switch 1E according to the comparative example. Therefore, the arc can be extended longer than the conventional technologies. As a result, performance of extinguishing the arc can be enhanced, and circuit current interruption performance of the switch 1 can be enhanced.

Further, in the present embodiment, the auxiliary yoke 6 includes: the second connection portion 61 directly connected to the first magnetic pole surface 41; and the pair of extending portions 62 extending farther than the first magnetic pole surface 41 in the Z-axis direction from both end portions of the second connection portion 61 along the Z-axis direction, and extending so as to approach the movable contact 3 as advancing away from the second connection portion 61. As a result, the magnetic flux guided to the arc extinguishing space 8 further increases, and the magnetic flux density in the arc extinguishing space 8 can be further increased. Therefore, the arc can be extended longer than the conventional technologies.

Further, in the present embodiment, the switch 1 includes the auxiliary yokes 6 each disposed between the magnet 4 and the movable contact 3. Therefore, the magnetic flux can be guided toward the movable contact point 31 and the fixed contact point 21 to enhance a magnetic flux density around the movable contact point 31 and the fixed contact point 21, and the arc can be quickly driven in a direction away from the movable contact point 31 and the fixed contact point 21.

Note that, when the direction Y2 of the current flowing through the movable contact 3 is a direction opposite to the direction illustrated in FIGS. 4 and 5, that is, a direction along the Y-axis direction from the second magnet 4*b* toward the first magnet 4*a*, the driving direction of the arc indicated by the arrow Y3 is symmetrical to that in the illustrated example about the second centerline C2 as a boundary. Specifically, the arc generated between the first movable contact point 31*a* and the first fixed contact point 21*a* is driven toward the left and rear side with respect to the movable contact 3. Whereas, the arc generated between the second movable contact point 31*b* and the second fixed contact point 21*b* is driven toward the right and rear side with respect to the movable contact 3. Therefore, regardless of the direction Y2 of the current flowing through the movable contact 3, the arc can be extended longer than the conventional technologies.

Note that, the magnetic field generation means is the magnet 4 in the present embodiment, but the magnetic field generating means is not particularly limited as long as the magnetic field can be generated. The magnetic field generation means may be, for example, a coil. Further, the polarity of the first magnetic pole surface 41 of each magnet 4 is the N pole in the present embodiment, but may be the S pole.

In the present embodiment, the auxiliary yoke 6 including the second connection portion 61 and the pair of extending portions 62 are used, but the auxiliary yoke 6 in which the pair of extending portions 62 are omitted may be used. When the pair of extending portions 62 are omitted, the auxiliary yoke 6 extends linearly along the Z-axis direction. When the pair of extending portions 62 are omitted, the auxiliary yoke 6 may or may not project farther than the first magnetic pole surface 41 toward one side and another side in the Z-axis direction.

Second Embodiment

Next, with reference to FIGS. 6 to 8, a switch 1A according to a second embodiment will be described. FIG.

6 is a plan view illustrating the switch 1A according to the second embodiment. FIG. 7 is a cross-sectional view taken along line VII-VII illustrated in FIG. 6. FIG. 8 is a plan view for explaining an effect of the switch 1A according to the second embodiment. The present embodiment is different from the first embodiment described above in that polarities of the first magnetic pole surfaces 41 of the magnets 4 are different from each other and polarities of the second magnetic pole surfaces 42 of the magnets 4 are different from each other. Note that, in the second embodiment, identical reference numerals are given to portions overlapping with the first embodiment described above, and description thereof is omitted.

Figure 6:
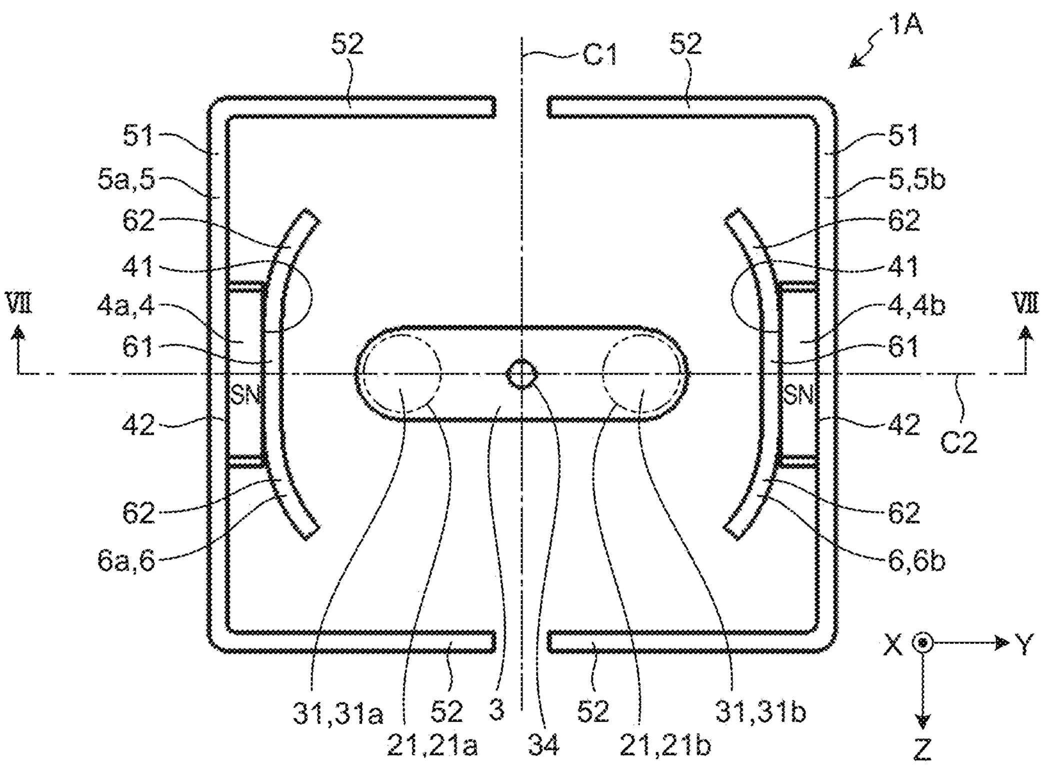
FIG. 6 is a plan view illustrating a switch according to a second embodiment.
Figure 7:
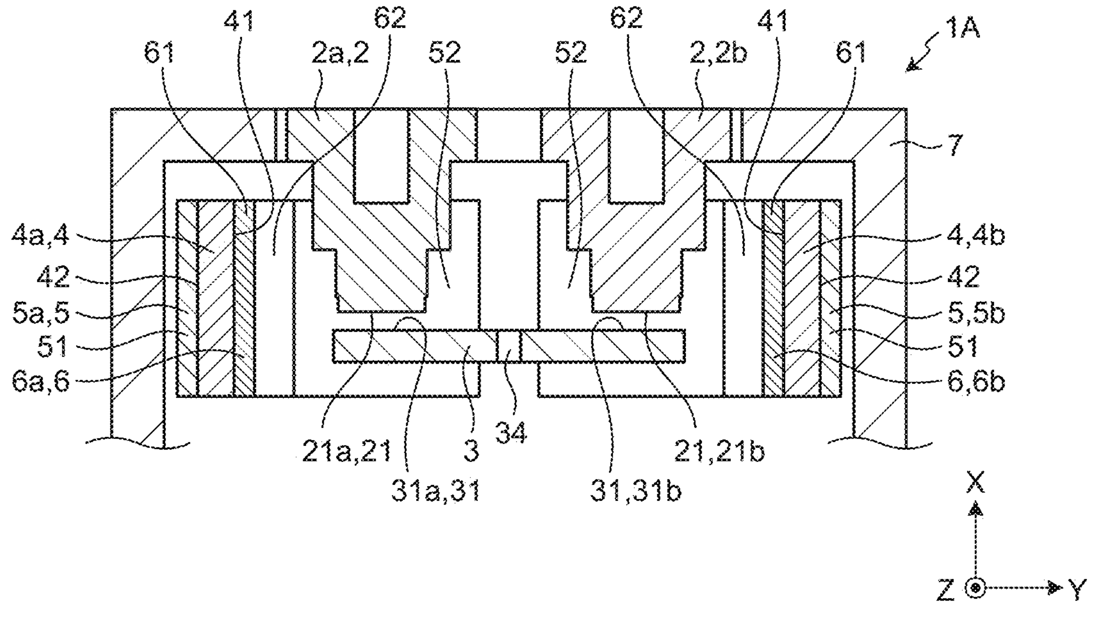
FIG. 7 is a cross-sectional view taken along line VII-VII illustrated in FIG. 6.

As illustrated in FIG. 6, the polarity of the first magnetic pole surface 41 of the first magnet 4*a* is the N pole in the present embodiment. The polarity of the first magnetic pole surface 41 of the second magnet 4*b* is the S pole in the present embodiment. The polarity of the second magnetic pole surface 42 of the first magnet 4*a* is the S pole in the present embodiment. The polarity of the second magnetic pole surface 42 of the second magnet 4*b* is the N pole in the present embodiment. As illustrated in FIGS. 6 and 7, the configurations of the fixed contacts 2 and the like are similar to those of the first embodiment.

Figure 8:
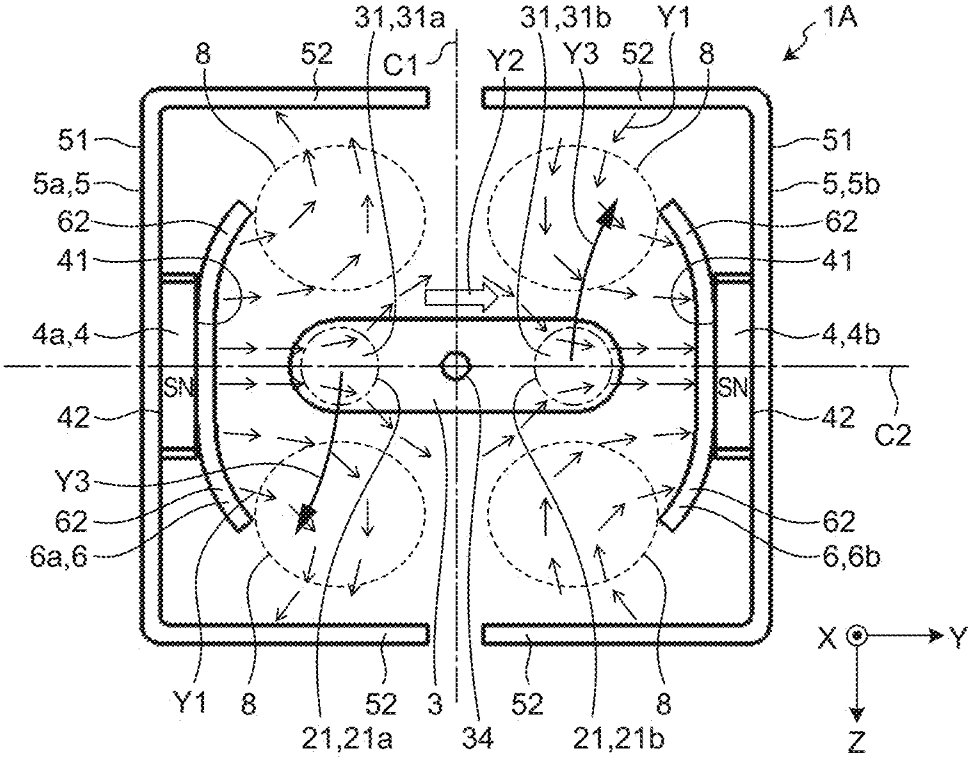
FIG. 8 is a plan view for explaining an effect of the switch according to the second embodiment.

As illustrated in FIG. 8, a flow of a magnetic flux generated from the second magnet 4*b* is opposite to a flow of a magnetic flux of the first embodiment illustrated in FIG. 5. Although not illustrated in FIG. 8, the magnetic flux generated from the second magnet 4*b* flows toward each arm portion 52 after passing through the first connection portion 51. Then, the magnetic flux generated from the second magnet 4*b* flows from each arm portion 52 toward the movable contact 3 and then toward the second magnet 4*b*. Part of the magnetic flux generated from the first magnet 4*a* flows toward the second magnet 4*b* along an extending direction of the movable contact 3.

Magnetic fields generated by the first magnet 4*a* are symmetrical about the second centerline C2 as a boundary. Magnetic fields generated by the second magnet 4*b* are symmetrical about the second centerline C2 as a boundary. Then, since the Lorentz force in the direction of the arrow Y3 acts on an arc, the arc is driven along the direction of the arrow Y3. Specifically, an arc generated between the first movable contact point 31*a* and the first fixed contact point 21*a* is driven toward the left and front side with respect to the movable contact 3. Whereas, the arc generated between the second movable contact point 31*b* and the second fixed contact point 21*b* is driven toward the right and rear side with respect to the movable contact 3.

The present embodiment can achieve the effects similar to those of the first embodiment described above. Further, in the present embodiment, since polarities of the first magnetic pole surfaces 41 of the magnets 4 are different from each other, the arc generated between the first movable contact point 31*a* and the first fixed contact point 21*a* and the arc generated between the second movable contact point 31*b* and the second fixed contact point 21*b* are driven in directions opposite to each other in the Y-axis direction and the Z-axis direction. Therefore, since it is possible to prevent the two arcs from being connected to each other and from being short-circuited, it is possible to enhance the performance of extinguishing the arc and to enhance the circuit current interruption performance of the switch 1A.

Third Embodiment

Figure 9:
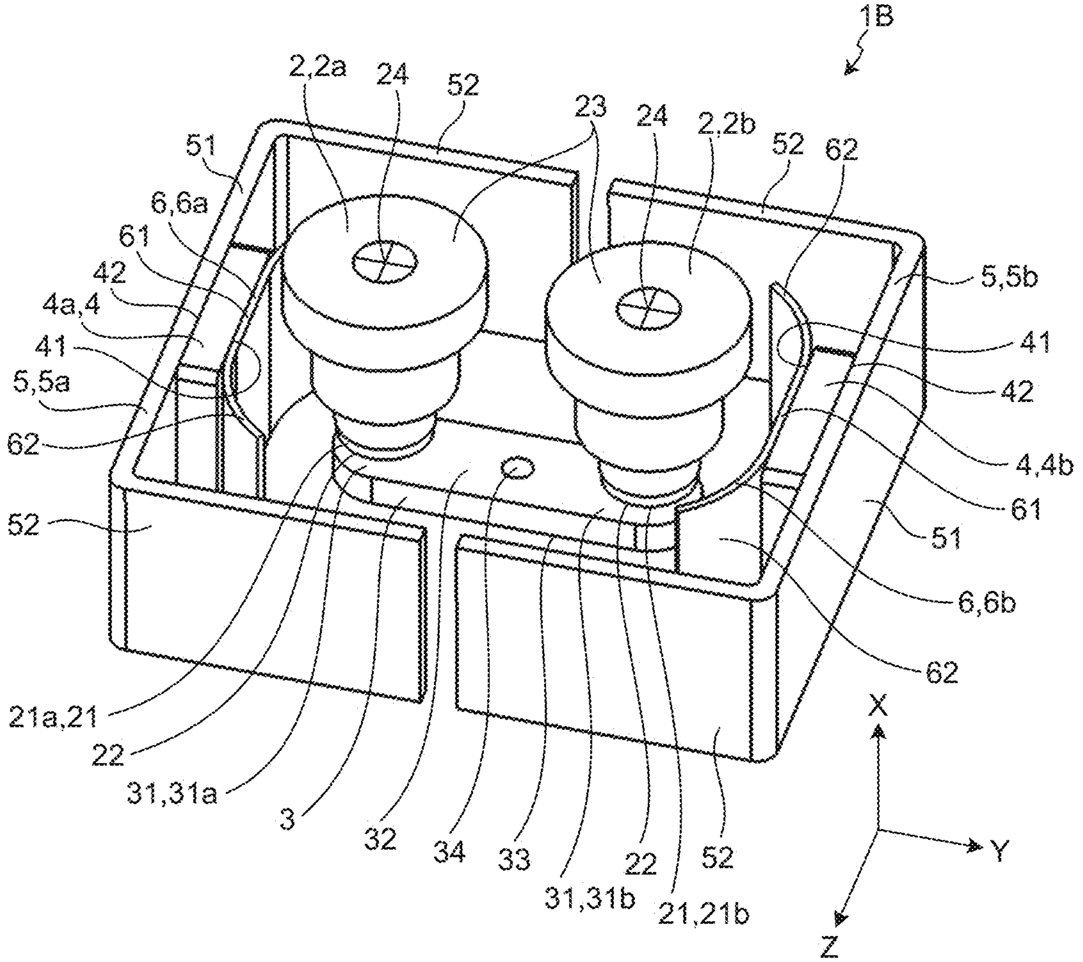
FIG. 9 is a perspective view illustrating a switch according to a third embodiment.
Figure 10:
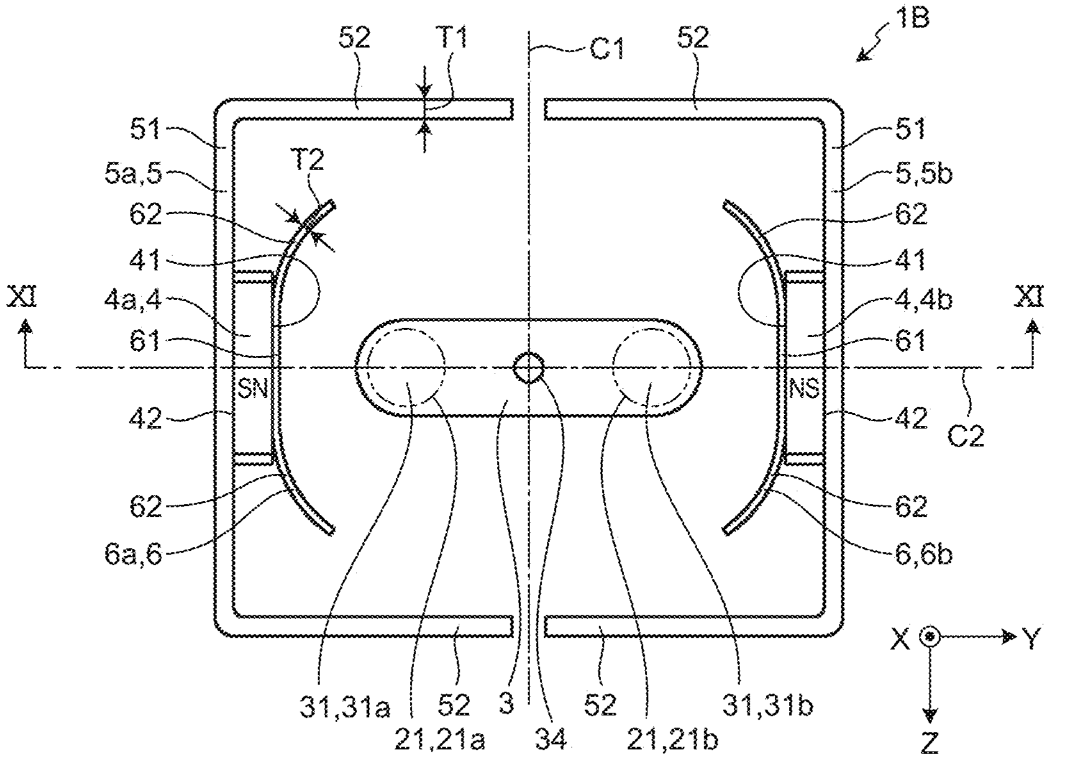
FIG. 10 is a plan view illustrating the switch according to the third embodiment.
Figure 11:
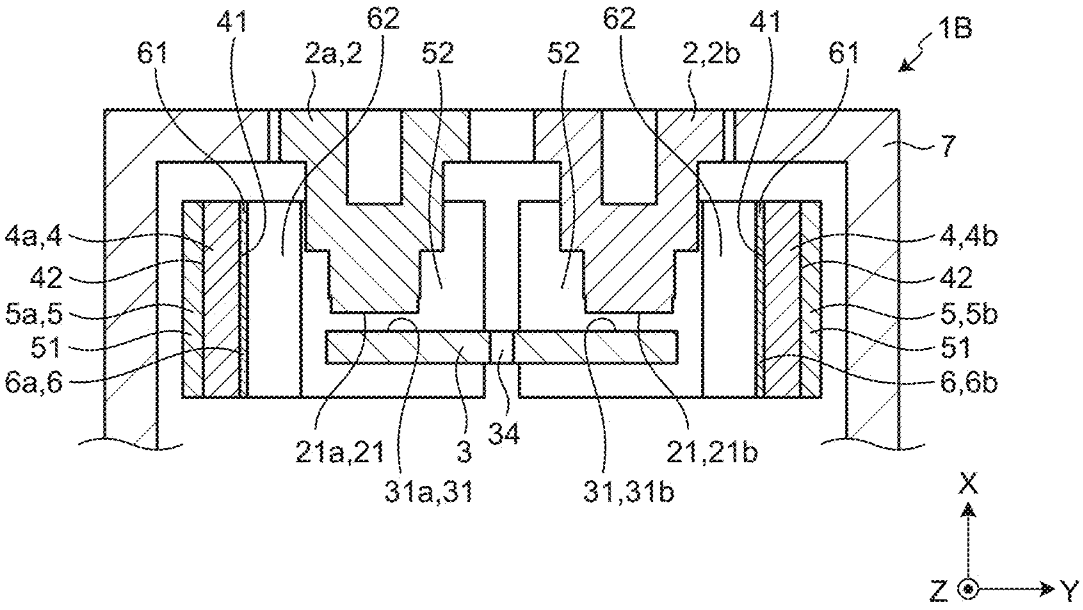
FIG. 11 is a cross-sectional view taken along line XI-XI illustrated in FIG. 10.

Next, with reference to FIGS. 9 to 11, a switch 1B according to a third embodiment will be described. FIG. 9 is a perspective view illustrating the switch 1B according to the third embodiment. FIG. 10 is a plan view illustrating the switch 1B according to the third embodiment. FIG. 11 is a cross-sectional view taken along line XI-XI illustrated in FIG. 10. The present embodiment is different from the first embodiment described above in that a plate thickness T1 of the main yoke 5 and a plate thickness T2 of the auxiliary yoke 6 are different from each other. Note that, in the third embodiment, identical reference numerals are given to portions overlapping with the first embodiment described above, and description thereof is omitted.

As illustrated in FIGS. 9 to 11, the plate thickness T2 of the auxiliary yoke 6 is thinner than the plate thickness T1 of the main yoke 5. The cross-sectional area of the extending portion 62 taken along a direction orthogonal to the X-axis direction is smaller than the cross-sectional area of the arm portion 52 taken along a direction orthogonal to the X-axis direction.

In the present embodiment, since the plate thickness T2 of the auxiliary yoke 6 is thinner than the plate thickness T1 of the main yoke 5, the auxiliary yoke 6 is likely to be magnetically saturated. Therefore, a magnetic flux generated from the magnet 4 easily leaks to the movable contact point 31 and the fixed contact point 21 via the auxiliary yoke 6, and a magnetic flux density around the movable contact point 31 and the fixed contact point 21 can be increased. As a result, the arc can be driven more quickly.

Note that, in the present embodiment, the plate thickness T2 of the auxiliary yoke 6 is made thinner than the plate thickness T1 of the main yoke 5 over the entire auxiliary yoke 6, but it suffices that the plate thickness of at least the extending portion 62 is thinner than the plate thickness of the arm portion 52. If the cross-sectional area of the auxiliary yoke 6 is made smaller than the cross-sectional area of the main yoke 5, magnetic saturation of the auxiliary yoke 6 can be easily generated. As an example, the present embodiment has shown a configuration in which the plate thickness T2 of the auxiliary yoke 6 is made thinner than the plate thickness T1 of the main yoke 5. Examples of the configuration in which the cross-sectional area of the auxiliary yoke 6 is made smaller than the cross-sectional area of the main yoke 5 include a configuration in which the length of the main yoke 5 along the X-axis direction and the length of the auxiliary yoke 6 along the X-axis direction are made different, and a configuration in which a notch is formed in the auxiliary yoke 6, in addition to the configuration in which the plate thickness T1 of the main yoke 5 and the plate thickness T2 of the auxiliary yoke 6 are made different as in the present embodiment. When the cross-sectional area of the auxiliary yoke 6 is made smaller than the cross-sectional area of the main yoke 5, it suffices that the cross-sectional area of at least the extending portion 62 is smaller than the cross-sectional area of the arm portion 52.

Fourth Embodiment

Figure 12:
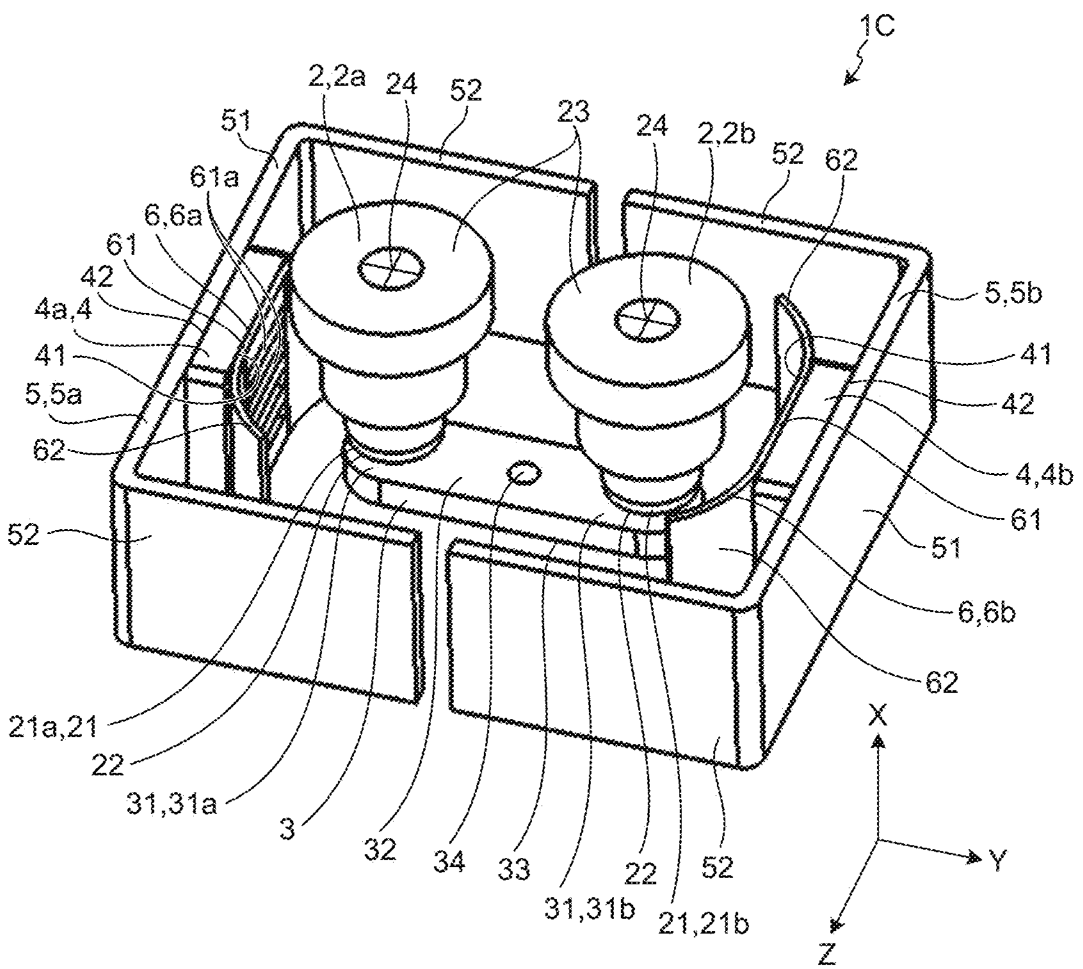
FIG. 12 is a perspective view illustrating a switch according to a fourth embodiment.
Figure 13:
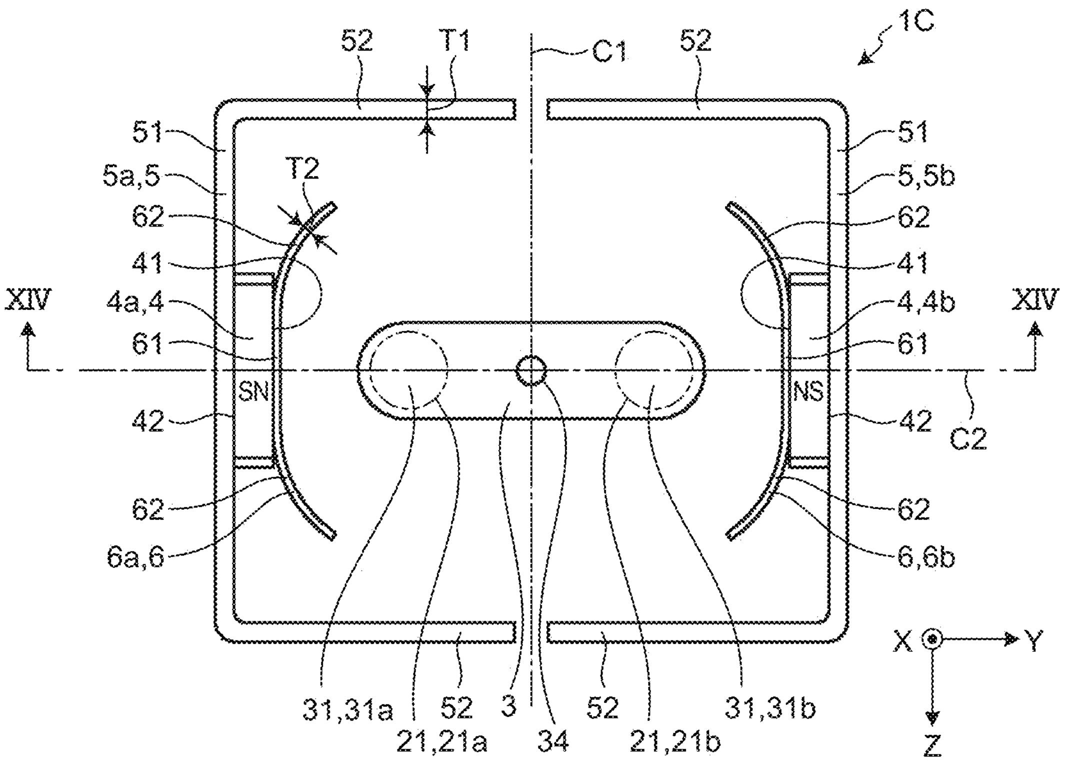
FIG. 13 is a plan view illustrating the switch according to the fourth embodiment.
Figure 14:
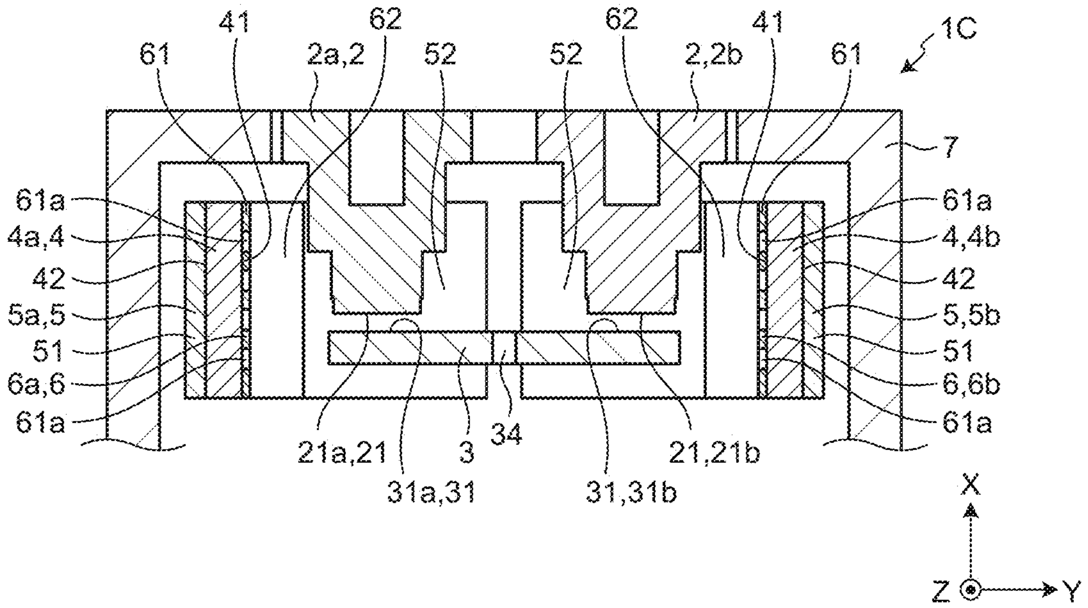
FIG. 14 is a cross-sectional view taken along line XIV-XIV illustrated in FIG. 13.
Figure 15:
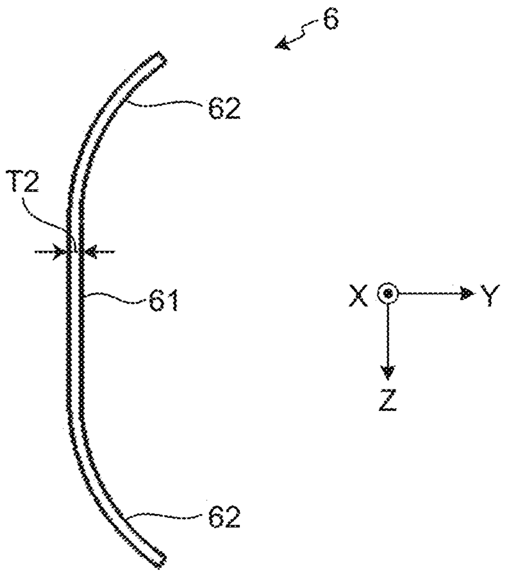
FIG. 15 is a plan view illustrating an auxiliary yoke according to the fourth embodiment.
Figure 16:
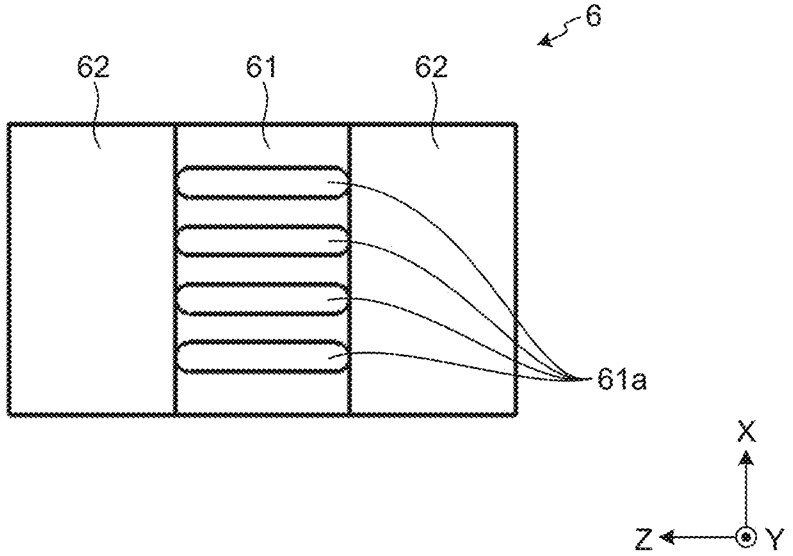
FIG. 16 is a front view illustrating the auxiliary yoke according to the fourth embodiment.
Figure 17:
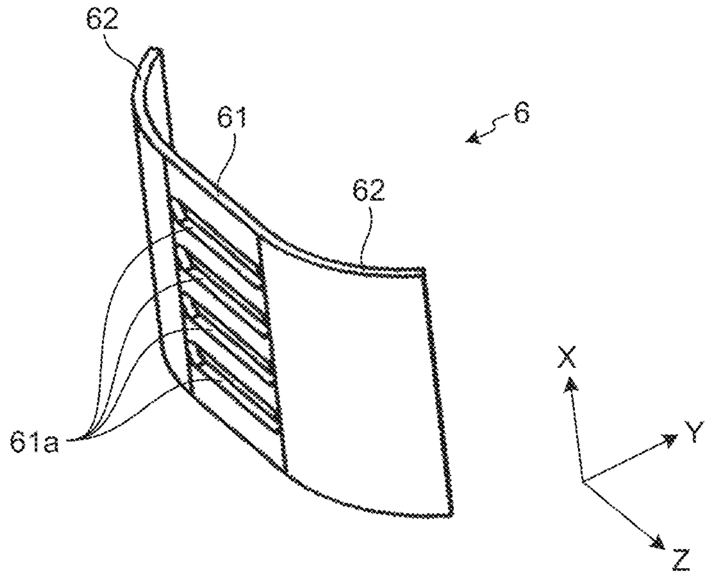
FIG. 17 is a perspective view illustrating the auxiliary yoke according to the fourth embodiment.

Next, with reference to FIGS. 12 to 17, a switch 1C according to a fourth embodiment will be described. FIG. 12 is a perspective view illustrating the switch 1C according to the fourth embodiment. FIG. 13 is a plan view illustrating the switch 1C according to the fourth embodiment. FIG. 14 is a cross-sectional view taken along line XIV-XIV illustrated in FIG. 13. FIG. 15 is a plan view illustrating the auxiliary yoke 6 according to the fourth embodiment. FIG. 16 is a front view illustrating the auxiliary yoke 6 according to the fourth embodiment. FIG. 17 is a perspective view illustrating the auxiliary yoke 6 according to the fourth embodiment. The present embodiment is different from the third embodiment described above in that holes 61*a* are formed in the auxiliary yoke 6. Note that, in the fourth embodiment, identical reference numerals are given to portions overlapping with the first and third embodiments described above, and the description thereof will be omitted.

As illustrated in FIGS. 12 and 14, a plurality of holes 61*a* penetrating in the Y-axis direction are formed in the second connection portion 61 of the auxiliary yoke 6. As illustrated in FIG. 14, the holes 61*a* are formed along an in-plane direction of the first magnetic pole surface 41. As illustrated in FIGS. 16 and 17, the holes 61*a* are long holes longer in the Z-axis direction than in the X-axis direction. The plurality of holes 61*a* are provided apart from each other in the X-axis direction. Note that the plurality of holes 61*a* may be long holes longer in the X-axis direction than in the Z-axis direction and provided apart from each other in the Z-axis direction, or may be holes having a circular shape, a quadrangular shape, a triangular shape, or the like and be provided apart from each other in the X-axis direction and the Z-axis direction.

In the present embodiment, as illustrated in FIG. 12, since the plurality of holes 61*a* penetrating in the Y-axis direction are formed in the second connection portion 61 of the auxiliary yoke 6, a magnetic flux generated from the magnet 4 easily leaks to the movable contact point 31 and the fixed contact point 21 via the auxiliary yoke 6, and a magnetic flux density around the movable contact point 31 and the fixed contact point 21 can be increased. As a result, the arc can be driven more quickly.

Note that, the present embodiment has exemplified a case in which, as illustrated in FIGS. 13 and 15, the plate thickness T2 of the auxiliary yoke 6 is made thinner than the plate thickness T1 of the main yoke 5, and the holes 61*a* are formed in the second connection portion 61 of the auxiliary yoke 6 as illustrated in FIGS. 16 and 17, but the present disclosure is not limited thereto. For example, the plate thickness T2 of the auxiliary yoke 6 may be made equal to the plate thickness T1 of the main yoke 5, and the holes 61*a* may be formed in the second connection portion 61 of the auxiliary yoke 6. Also in such a case, the effect of driving the arc more quickly can be obtained.

Fifth Embodiment

Figure 18:
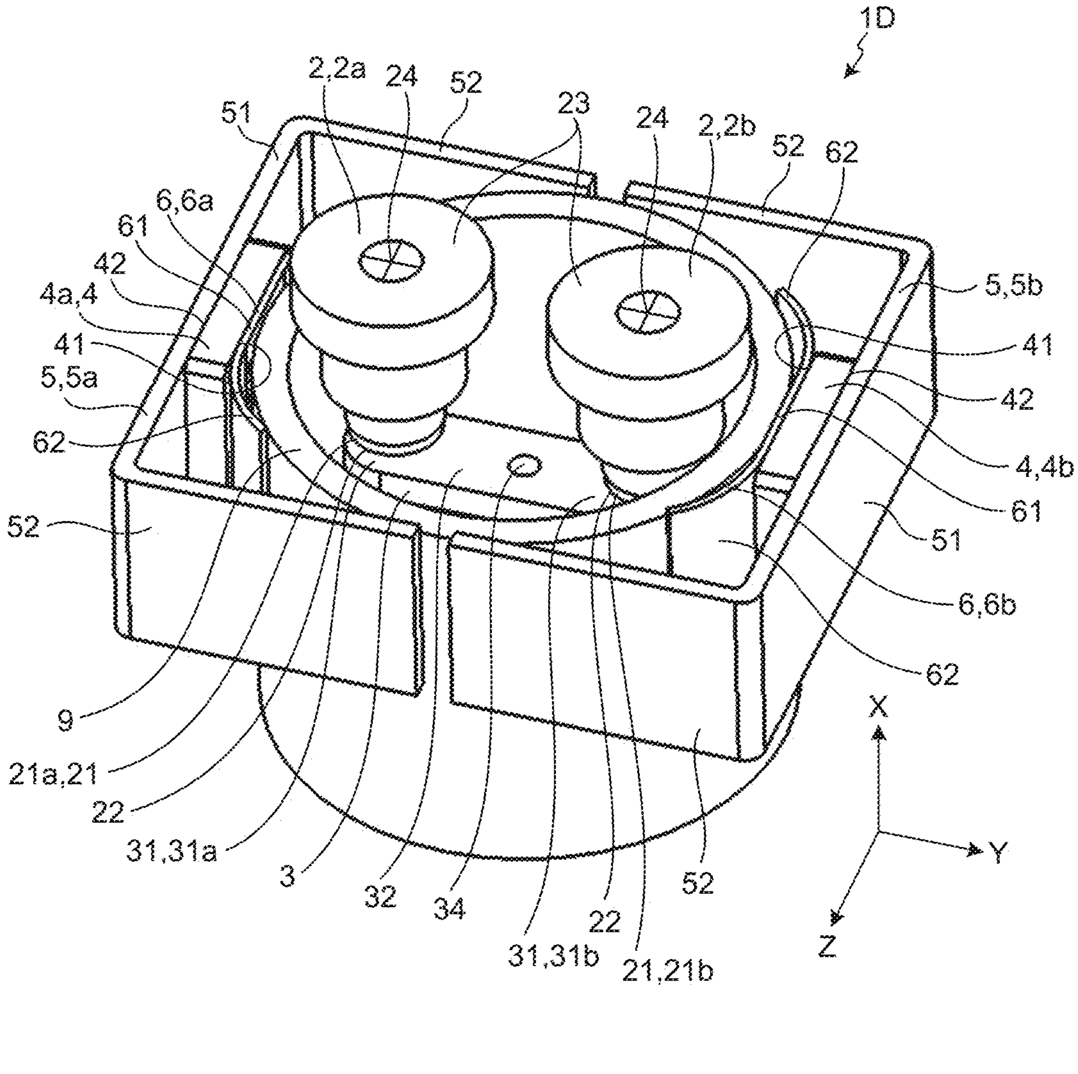
FIG. 18 is a perspective view illustrating a switch according to a fifth embodiment.
Figure 19:
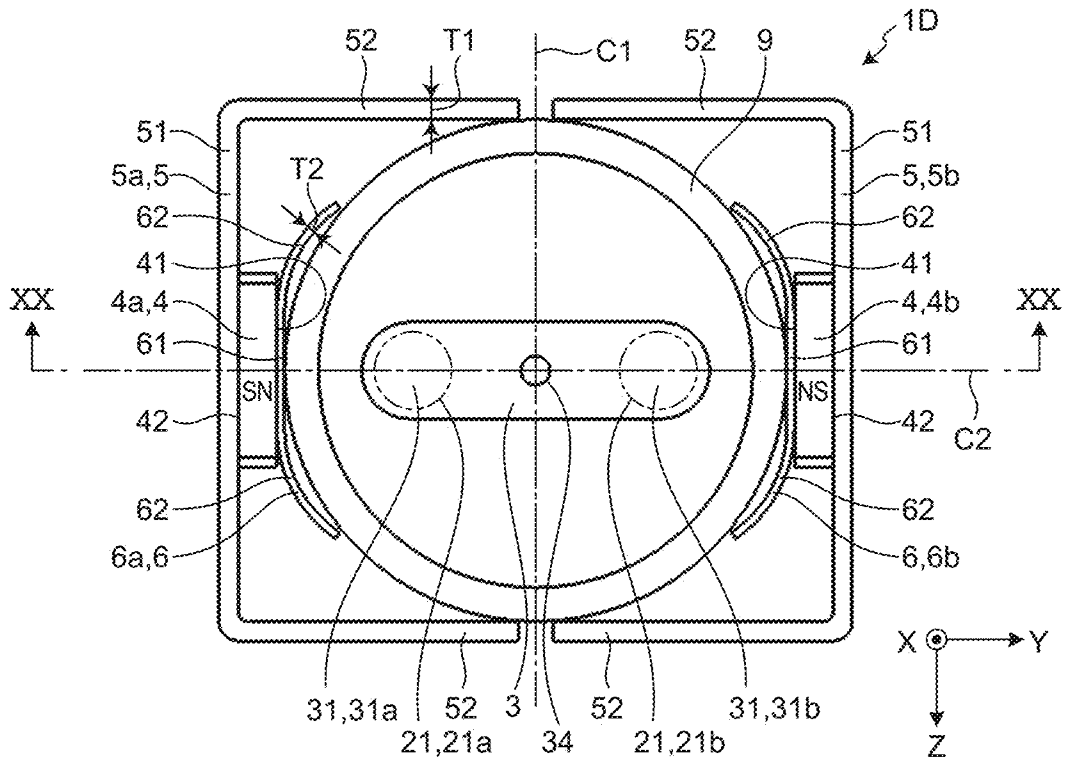
FIG. 19 is a plan view illustrating the switch according to the fifth embodiment.
Figure 20:
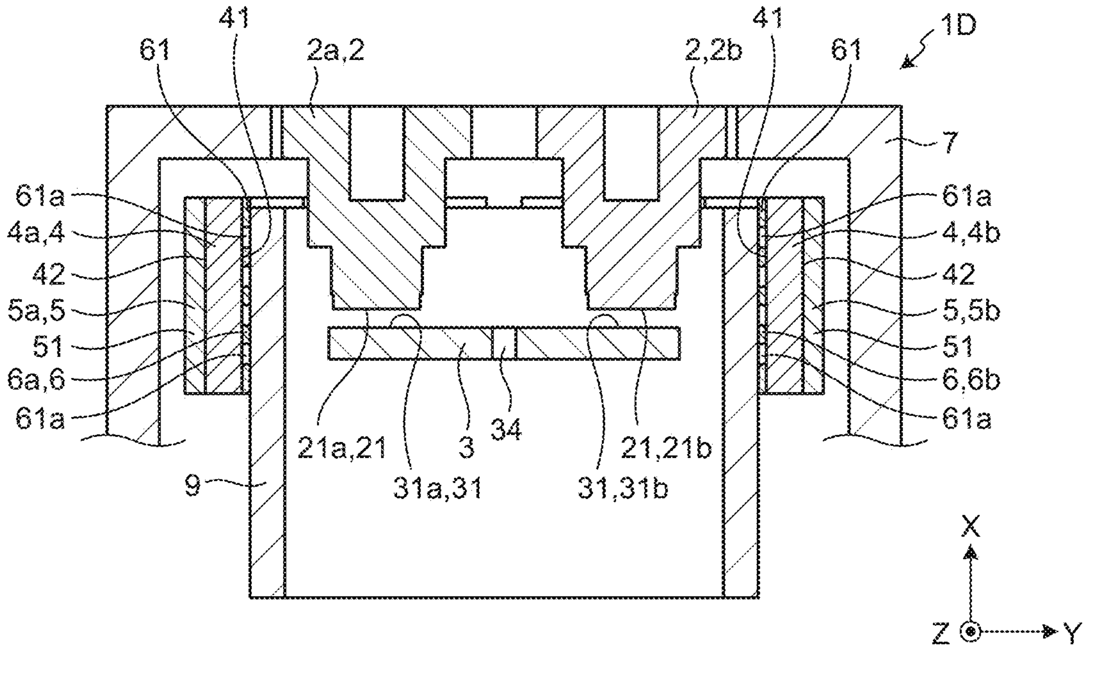
FIG. 20 is a cross-sectional view taken along line XX-XX illustrated in FIG. 19.

Next, a switch 1D according to a fifth embodiment will be described with reference to FIGS. 18 to 20. FIG. 18 is a perspective view illustrating the switch 1D according to the fifth embodiment. FIG. 19 is a plan view illustrating the switch 1D according to the fifth embodiment. FIG. 20 is a cross-sectional view taken along line XX-XX illustrated in FIG. 19. The present embodiment is different from the fourth embodiment described above in that an insulating member 9 is provided between the movable contact 3 and each auxiliary yoke 6. Note that, in the fifth embodiment, identical reference numerals are given to portions overlapping with the first, third, and fourth embodiments described above, and the description thereof will be omitted.

As illustrated in FIGS. 18 and 19, the insulating member 9 is provided so as to surround a periphery of the movable contact 3. The insulating member 9 is provided between the movable contact 3 and each of the auxiliary yokes 6 and each of the arm portions 52. The insulating member 9 separates the movable contact 3 from the auxiliary yokes 6 and the arm portions 52. The insulating member 9 thermally insulates the movable contact 3 from the auxiliary yokes 6 and the arm portions 52. The shape of the insulating member 9 is cylindrical in the present embodiment, but is not particularly limited as long as at least the movable contact 3 and the auxiliary yoke 6 can be thermally insulated from each other. For example, the shape of the insulating member 9 may be a quadrangular cylinder. A material of the insulating member 9 may be, for example, an inorganic insulating material such as ceramic, or an organic insulating material such as a synthetic resin material.

When an arc is generated between the movable contact point 31 and the fixed contact point 21 illustrated in FIG. 20, the arc is extended by an electromagnetic force, but may come into contact with the auxiliary yoke 6 in some driving situations of the arc. When the arc comes into contact with the auxiliary yoke 6, heat of the high-temperature arc is transferred to the magnet 4 via the auxiliary yoke 6, and the magnet 4 is thermally demagnetized, so that magnetic performance of the magnet 4 may be deteriorated. Further, when the auxiliary yoke 6 has high conductivity, the arc continues to be in contact with the auxiliary yoke 6, and the auxiliary yoke 6 may be thermally worn.

In this regard, in the present embodiment, since the insulating member 9 that thermally insulates the movable contact 3 from the auxiliary yoke 6 is provided between the movable contact 3 and the auxiliary yoke 6, contact between the arc and the auxiliary yoke 6 can be prevented. Therefore, it is possible to prevent deterioration in magnetic performance of the magnet 4 due to thermal demagnetization, and prevent thermal wear of the auxiliary yoke 6. Further, in the present embodiment, the insulating member 9 is also provided between the movable contact 3 and the arm portion 52. Therefore, contact between the arc and the arm portion 52 can be prevented, so that thermal wear of the arm portion 52 can be prevented.

Sixth Embodiment

Figure 21:
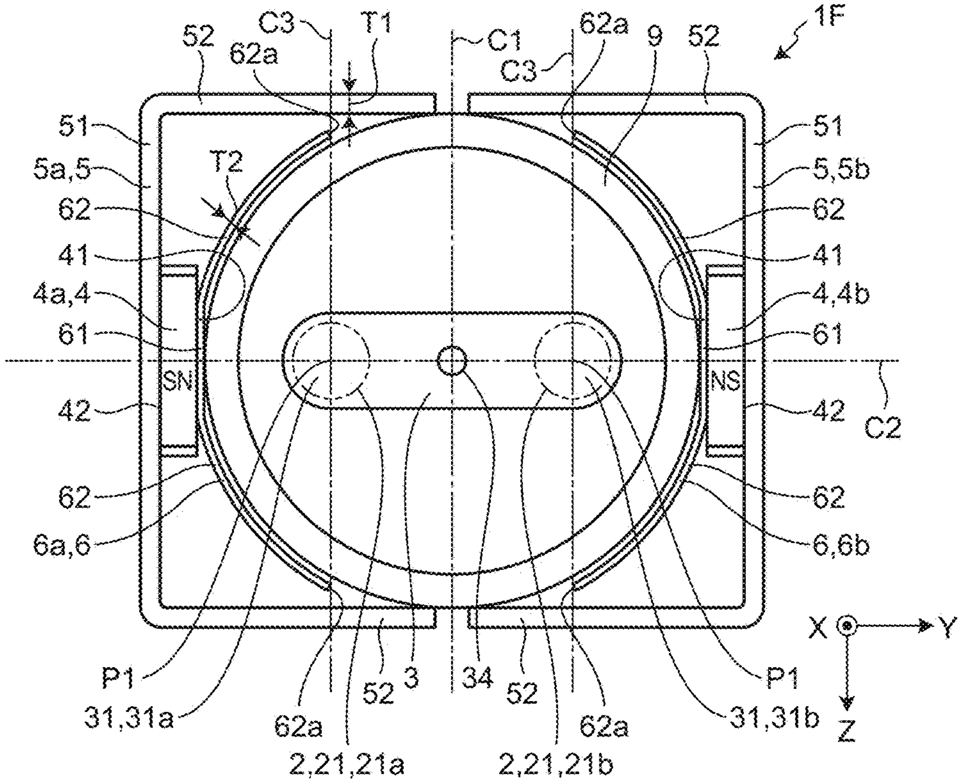
FIG. 21 is a plan view illustrating a switch according to a sixth embodiment.

Next, with reference to FIG. 21, a switch 1F according to a sixth embodiment will be described. FIG. 21 is a plan view illustrating the switch 1F according to the sixth embodiment. The present embodiment is different from the first to fifth embodiments described above in that the extending portion 62 of the auxiliary yoke 6 is extended until the position in the Y-axis direction coincides with a center P1 of the movable contact point 31. Note that, the sixth embodiment, identical reference numerals are given to portions overlapping with the first to fifth embodiments described above, and the description thereof will be omitted.

As illustrated in FIG. 21, when the center of the movable contact point 31 in the Y-axis direction is defined as the center P1 of the movable contact point 31, the extending portion 62 of the auxiliary yoke 6 extends until the position in the Y-axis direction coincides with the center P1 of the movable contact point 31. The center P1 of the movable contact point 31 is the center of the movable contact point 31 in an extending direction of the movable contact 3. That is, the center P1 of the movable contact point 31 is the center of the movable contact point 31 in the Y-axis direction in FIG. 21. Hereinafter, a virtual straight line extending along the Z-axis direction through the center P1 of the movable contact point 31 is defined as a third centerline C3. The extending portion 62 of the first auxiliary yoke 6*a* extends until the position in the Y-axis direction coincides with the center P1 of the first movable contact point 31*a*, which is one of the two movable contact points 31 and is closer to the extending portion 62 of the first auxiliary yoke 6*a* in the Y-axis direction. A distal end 62*a* of the extending portion 62 of the first auxiliary yoke 6*a* reaches the third centerline C3 that passes through the center P1 of the first movable contact point 31*a*. The extending portion 62 of the second auxiliary yoke 6*b* extends until the position in the Y-axis direction coincides with the center P1 of the second movable contact point 31*b*, which is one of the two movable contact points 31 and is closer to the extending portion 62 of the first auxiliary yoke 6*b* in the Y-axis direction. The distal end 62*a* of the extending portion 62 of the second auxiliary yoke 6*b* reaches the third centerline C3 that passes through the center P1 of the second movable contact point 31*b*.

The extending portion 62 of the auxiliary yoke 6 extends so as to approach the movable contact 3 in the Y-axis direction as advancing away from the second connection portion 61. The extending portion 62 of the auxiliary yoke 6 extends away from the movable contact 3 in the Z-axis direction as advancing away from the second connection portion 61. The distal end 62*a* of the extending portion 62 of the auxiliary yoke 6 is at a position farthest from the movable contact 3 in the extending portion 62 in the Z-axis direction. As illustrated in FIG. 21, the extending portion 62 of the auxiliary yoke 6 has a shape along the insulating member 9. Since the insulating member 9 illustrated in FIG. 21 has a cylindrical shape, the extending portion 62 of the auxiliary yoke 6 has an arc shape along the insulating member 9. The shape of the extending portion 62 of the auxiliary yoke 6 is appropriately changed in accordance with the shape of the insulating member 9. For example, when the shape of the insulating member 9 is a quadrangular cylinder, an elliptical cylinder, or the like, the shape of the extending portion 62 of the auxiliary yoke 6 is linear along the Y-axis direction.

When an arc is generated between the movable contact point 31 and the fixed contact point 21 illustrated in FIG. 21, the arc is extended by an electromagnetic force toward the distal end 62*a* of the extending portion 62 of the auxiliary yoke 6. In order to increase the length of the extended arc, it is necessary to extend the extending portion 62 of the auxiliary yoke 6 toward the first centerline C1. However, when the extending portion 62 of the auxiliary yoke 6 is extended until the distal end 62*a* of the extending portion 62 of the auxiliary yoke 6 exceeds the center P1 of the movable contact point 31 in the Y-axis direction, that is, as the distal end 62*a* of the extending portion 62 of the auxiliary yoke 6 is closer to the first centerline C1, an arc generated between the first movable contact point 31*a* and the first fixed contact point 21*a* and an arc generated between the second movable contact point 31*b* and the second fixed contact point 21*b* are likely to come into contact with each other. As a result, since the two arcs are integrated into one arc, arc resistance is reduced, and the performance of extinguishing the arc may be deteriorated.

In this regard, in the present embodiment, the extending portion 62 of the auxiliary yoke 6 extends until the position in the Y-axis direction coincides with the center P1 of the movable contact point 31. Therefore, it is possible to prevent deterioration in the performance of extinguishing the arc by reducing contact between the arc generated between the first movable contact point 31*a* and the first fixed contact point 21*a* and the arc generated between the second movable contact point 31*b* and the second fixed contact point 21*b*, while ensuring the performance of sufficiently extending the arc.

Seventh Embodiment

Figure 22:
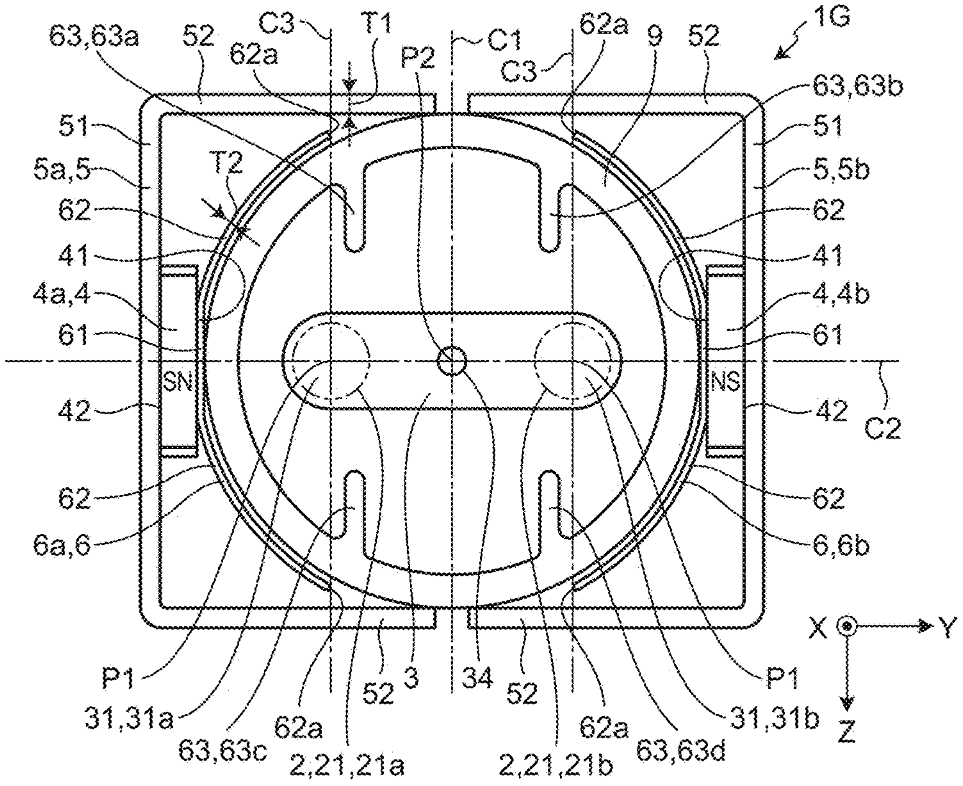
FIG. 22 is a plan view illustrating a switch according to a seventh embodiment.

Next, with reference to FIG. 22, a switch 1G according to a seventh embodiment will be described. FIG. 22 is a plan view illustrating the switch 1G according to the seventh embodiment. The present embodiment is different from the sixth embodiment described above in that separation walls 63 are provided in portions of the insulating member 9 located between the extending portions 62 of the auxiliary yokes 6 and a center P2 of the movable contact 3 in the Y-axis direction. Note that, in the seventh embodiment, identical reference numerals are given to portions overlapping with the first to sixth embodiments described above, and the description thereof will be omitted.

As illustrated in FIG. 22, the switch 1G includes the insulating member 9 that separates the movable contact 3, the movable contact points 31, the fixed contacts 2, and the fixed contact points 21 from the magnets 4, the main yokes 5, and the auxiliary yokes 6, in the Y-axis direction and the Z-axis direction. The insulating member 9 electrically, thermally, and spatially separates the movable contact 3, the movable contact points 31, the fixed contacts 2, and the fixed contact points 21 from the magnets 4, the main yokes 5, and the auxiliary yokes 6. When the center of the movable contact 3 in the Y-axis direction is defined as the center P2 of the movable contact 3, the separation walls 63 are provided in portions of the insulating member 9 located between the extending portions 62 and the center P2 of the movable contact 3 in the Y-axis direction. The separation wall 63 is preferably at a position coinciding with the distal end 62*a* of the extending portion 62 in the Y-axis direction, or a position closer to the distal end 62*a* of the extending portion 62 than the center P2 of the movable contact 3 in the Y-axis direction. The center P2 of the movable contact 3 is the center of the movable contact 3 in an extending direction of the movable contact 3. That is, the center P2 of the movable contact 3 is the center of the movable contact 3 in the Y-axis direction of FIG. 22.

The center P2 of the movable contact 3 and the centers P1 of the movable contact points 31 coincide in position with each other in the Z-axis direction. The center P2 of the movable contact 3 and the centers P1 of the movable contact points 31 are shifted in position in the Y-axis direction. The center P2 of the movable contact 3 is located between the centers P1 of the two movable contact points 31 in the Y-axis direction. Specifically, the center P2 of the movable contact 3 is located intermediate the centers P1 of the two movable contact points 31 in the Y-axis direction. The center P2 of the movable contact 3 is located at a position farther away from the magnet 4, the first connection portion 51, and the second connection portion 61 than the center P1 of the movable contact point 31 in the Y-axis direction. The first centerline C1 is a virtual straight line extending along the Z-axis direction through the center P2 of the movable contact 3.

The separation wall 63 extends in the Z-axis direction from the insulating member 9 toward the movable contact 3. The number of the separation walls 63 is four in the present embodiment, but at least one is sufficient. The four separation walls 63 are referred to as a first separation wall 63*a*, a second separation wall 63*b*, a third separation wall 63*c*, and a fourth separation wall 63*d* when being distinguished from each other. The separation wall 63 is provided between the extending portion 62 of the auxiliary yoke 6 and the center P2 of the movable contact 3 in the Y-axis direction. In other words, the separation wall 63 is provided between the extending portion 62 of the auxiliary yoke 6 and the first centerline C1 in the Y-axis direction. The separation walls 63 are provided, one between each extending portion 62 and the first centerline C1 in the Y-axis direction.

Two separation walls 63 are provided between one extending portion 62 of the first auxiliary yoke 6*a* and one extending portion 62 of the second auxiliary yoke 6*b* in the Y-axis direction. The first separation wall 63*a* and the second separation wall 63*b* are provided between one extending portion 62 of the first auxiliary yoke 6*a* and one extending portion 62 of the second auxiliary yoke 6*b*. The first separation wall 63*a* and the second separation wall 63*b* are disposed apart from each other in the Y-axis direction. The first separation wall 63*a* and the second separation wall 63*b* are formed independently of each other in the present embodiment, but may be integrated. In other words, one separation wall 63 may be provided between one extending portion 62 of the first auxiliary yoke 6*a* and one extending portion 62 of the second auxiliary yoke 6*b*, and this separation wall 63 may include two wall portions separated from each other in the Y-axis direction and extending in the z-axis direction toward the movable contact 3.

Two separation walls 63 are provided between another extending portion 62 of the first auxiliary yoke 6*a* and another extending portion 62 of the second auxiliary yoke 6*b* in the Y-axis direction. The third separation wall 63*c* and the fourth separation wall 63*d* are provided between another extending portion 62 of the first auxiliary yoke 6*a* and another extending portion 62 of the second auxiliary yoke 6*b*. The third separation wall 63*c* and the fourth separation wall 63*d* are disposed apart from each other in the Y-axis direction. The third separation wall 63*c* and the fourth separation wall 63*d* are formed independently of each other in the present embodiment, but may be integrated. In other words, one separation wall 63 may be provided between another extending portion 62 of the first auxiliary yoke 6*a* and another extending portion 62 of the second auxiliary yoke 6*b*, and this separation wall 63 may include two wall portions separated from each other in the Y-axis direction and extending in the Z-axis direction toward the movable contact 3. Note that, in the example of FIG. 22, the extending portion 62 of the auxiliary yoke 6 extends until the position in the Y-axis direction coincides with the center P1 of the movable contact point 31, but may not extend until the position in the Y-axis direction coincides with the center P1 of the movable contact point 31.

When an arc is generated between the movable contact point 31 and the fixed contact point 21 illustrated in FIG. 22, the arc is extended by an electromagnetic force toward the distal end 62*a* of the extending portion 62 of the auxiliary yoke 6. However, as described in the sixth embodiment described above, as the distal end 62*a* of the extending portion 62 of the auxiliary yoke 6 is closer to the first centerline C1, an arc generated between the first movable contact point 31*a* and the first fixed contact point 21*a* and an arc generated between the second movable contact point 31*b* and the second fixed contact point 21*b* are likely to come into contact with each other. As a result, since the two arcs are integrated into one arc, arc resistance is reduced, and the performance of extinguishing the arc may be deteriorated.

In this regard, in the present embodiment, the separation walls 63 extending in the Z-axis direction from the insulating member 9 toward the movable contact 3 are provided in portions of the insulating member 9 located between the extending portions 62 and the center P2 of the movable contact 3 in the Y-axis direction. Therefore, the arc extended up to the vicinity of the distal end 62*a* of the extending portion 62 of the first auxiliary yoke 6*a* and the arc extended up to the vicinity of the distal end 62*a* of the extending portion 62 of the second auxiliary yoke 6*b* are separated from each other. In this state, it is possible to maintain a state in which the arc is extended up to the arc extinguishing space 8 (not illustrated in FIG. 22), and thus, it is possible to extinguish the arc quickly.

Eighth Embodiment

Figure 23:
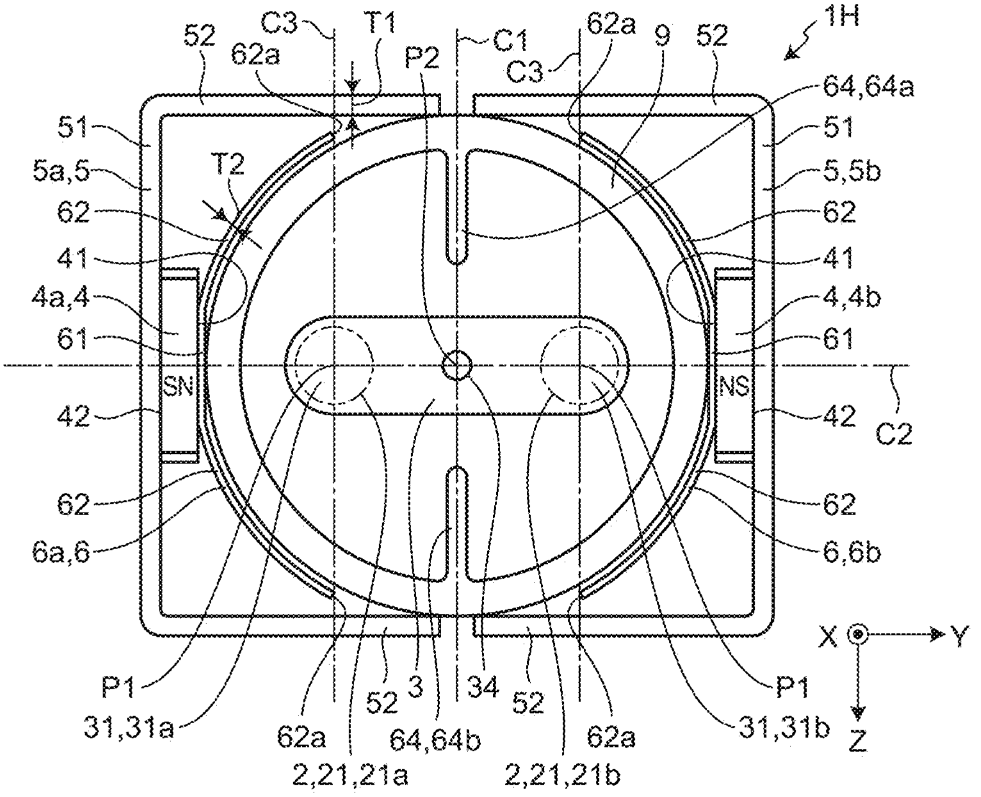
FIG. 23 is a plan view illustrating a switch according to an eighth embodiment.

Next, with reference to FIG. 23, a switch 1H according to an eighth embodiment will be described. FIG. 23 is a plan view illustrating the switch 1H according to the eighth embodiment. The present embodiment is different from the sixth and seventh embodiments described above in that insulating walls 64 are provided in portions of the insulating member 9 coinciding with the center P2 of the movable contact 3 in the Y-axis direction. Note that, in the eighth embodiment, identical reference numerals are given to portions overlapping with the first to seventh embodiments described above, and the description thereof will be omitted.

As illustrated in FIG. 23, the switch 1H includes the insulating member 9 that separates the movable contact 3, the movable contact points 31, the fixed contacts 2, and the fixed contact points 21 from the magnets 4, the main yokes 5, and the auxiliary yokes 6, in the Y-axis direction and the Z-axis direction. The insulating member 9 electrically, thermally, and spatially separates the movable contact 3, the movable contact points 31, the fixed contacts 2, and the fixed contact points 21 from the magnets 4, the main yokes 5, and the auxiliary yokes 6. When the center of the movable contact 3 in the Y-axis direction is defined as the center P2 of the movable contact 3, the insulating walls 64 are provided in portions of the insulating member 9 coinciding with the center P2 of the movable contact 3 in the Y-axis direction.

The insulating wall 64 extends in the Z-axis direction from the insulating member 9 toward the movable contact 3. The number of the insulating walls 64 is two in the present embodiment, but at least one is sufficient. The two insulating walls 64 are referred to as a first insulating wall 64*a* and a second insulating wall 64*b* when being distinguished from each other. The position of the insulating wall 64 in the Y-axis direction coincides with the center P2 of the movable contact 3. In other words, the position of the insulating wall 64 in the Y-axis direction coincides with the position of the first centerline C1. The insulating walls 64 are provided, one on each of one side and another side of the movable contact 3 in the Z-axis direction.

One insulating wall 64 is provided between one extending portion 62 of the first auxiliary yoke 6*a* and one extending portion 62 of the second auxiliary yoke 6*b* in the Y-axis direction. The first insulating wall 64*a* is provided between one extending portion 62 of the first auxiliary yoke 6*a* and one extending portion 62 of the second auxiliary yoke 6*b*. One insulating wall. 64 is provided between another extending portion 62 of the first auxiliary yoke 6*a* and another extending portion 62 of the second auxiliary yoke 6*b* in the Y-axis direction. The second insulating wall 64*b* is provided between another extending portion 62 of the first auxiliary yoke 6*a* and another extending portion 62 of the second auxiliary yoke 6*b*. The two insulating walls 64 are provided at symmetrical positions in the z-axis direction with respect to the center P2 of the movable contact 3. Note that, in the example of FIG. 23, the extending portion 62 of the auxiliary yoke 6 extends until the position in the Y-axis direction coincides with the center P1 of the movable contact point 31, but may not extend until the position in the Y-axis direction coincides with the center P1 of the movable contact point 31.

When an arc is generated between the movable contact point 31 and the fixed contact point 21 illustrated in FIG. 23, the arc is extended by an electromagnetic force toward the distal end 62*a* of the extending portion 62 of the auxiliary yoke 6. However, as described in the sixth embodiment described above, as the distal end 62*a* of the extending portion 62 of the auxiliary yoke 6 is closer to the first centerline C1, an arc generated between the first movable contact point 31*a* and the first fixed contact point 21*a* and an arc generated between the second movable contact point 31*b* and the second fixed contact point 21*b* are likely to come into contact with each other. As a result, since the two arcs are integrated into one arc, arc resistance is reduced, and the performance of extinguishing the arc may be deteriorated.

In this regard, in the present embodiment, the insulating walls 64 extending in the Z-axis direction from the insulating member 9 toward the movable contact 3 are provided in portions of the insulating member 9 coinciding with the center P2 of the movable contact 3 in the Y-axis direction. As a result, even when the arc is extended up to the distal end 62*a* of the extending portion 62 of the auxiliary yoke 6, the insulating wall 64 is located between the arc extended up to the distal end 62*a* of the extending portion 62 of the first auxiliary yoke 6*a* and the arc extended up to the distal end 62*a* of the extending portion 62 of the second auxiliary yoke 6*b*. Therefore, the arc extended up to the distal end 62*a* of the extending portion 62 of the first auxiliary yoke 6*a* and the arc extended up to the distal end 62*a* of the extending portion 62 of the second auxiliary yoke 6*b* are separated from each other. In this state, it is possible to maintain a state in which the arc is extended up to the arc extinguishing space 8 (not illustrated in FIG. 23), and thus, it is possible to extinguish the arc quickly.

Note that, in the seventh embodiment described above, it is possible to maintain a state in which the arc generated between the first movable contact point 31*a* and the first fixed contact point 21*a* and the arc generated between the second movable contact point 31*b* and the second fixed contact point 21*b* are separated from each other, and are extended up to the vicinities of the distal ends 62*a* of the extending portions 62 of the auxiliary yokes 6. Whereas, in the present embodiment, since the insulating wall 64 is at a position that does not hinder movement of the arc in the Z-axis direction, there is a possibility that the arc is extended up to a position beyond the extending portion 62 of the auxiliary yoke 6. However, it is possible to maintain a state in which the arc generated between the first movable contact point 31*a* and the first fixed contact point 21*a* and the arc generated between the second movable contact point 31*b* and the second fixed contact point 21*b* are separated from each other, with a simpler configuration than the seventh embodiment described above. Which one of the configurations of the seventh and eighth embodiments described above is adopted or whether the configurations of both the seventh and eighth embodiments described above are used in combination may simply be appropriately selected in consideration of performance required for a product, the shape of the insulating member 9, and the like.

The configurations illustrated in the above embodiment illustrate one example and can be combined with another known technique, and it is also possible to combine embodiments with each other and omit or change a part of the configuration without departing from the subject matter of the present disclosure. In each of the embodiments described above, a two-point contact structure including two fixed contact points 21 and two movable contact points 31 has been adopted, but a one-point contact structure including one fixed contact point 21 and one movable contact point 31 may be adapted. In the case of the one-point contact structure, one magnet 4, one main yoke 5, and one auxiliary yoke 6 are provided.

REFERENCE SIGNS LIST

1, 1A, 1B, 1C, 1D, 1E, 1F, 1G, 1H switch; 2 fixed contact; 2*a* first fixed contact; 2*b* second fixed contact; 3 movable contact; 4 magnet; 4*a* first magnet; 4*b* second magnet; 5 main yoke; 5*a* first main yoke; 5*b* second main yoke; 6 auxiliary yoke; 6*a* first auxiliary yoke; 6*b* second auxiliary yoke; 7 case; 8 arc extinguishing space; 9 insulating member; 21 fixed contact point; 21*a* first fixed contact point; 21*b* second fixed contact point; 22 fixed-side first surface; 23 fixed-side second surface; 24 terminal screw; 31 movable contact point; 31*a* first movable contact point; 31*b* second movable contact point; 32 movable-side first surface; 33 movable-side second surface; 34 through hole; 41 first magnetic pole surface; 42 second magnetic pole surface; 51 first connection portion; 52 arm portion; 61 second connection portion; 61*a* hole; 62 extending portion; 62*a* distal end; 63 separation wall; 63*a* first separation wall; 63*b* second separation wall; 63*c* third separation wall; 63*d* fourth separation wall; 64 insulating wall; 64*a* first insulating wall; 64*b* second insulating wall; C1 first centerline; C2 second centerline; C3 third centerline; P1, P2 center; T1, T2 plate thickness.

The invention claimed is:

1. A switch comprising:

a fixed contact including a fixed contact point;

a movable contact including a movable contact point contactable with the fixed contact point, the movable contact being disposed to be movable in a first direction with respect to the fixed contact;

a magnetic field generating member disposed apart from the movable contact in a second direction orthogonal to the first direction, the magnetic field generating member including a first magnetic pole surface facing the movable contact and a second magnetic pole surface facing a side opposite to the movable contact;

a main yoke including a first connection portion and a pair of arm portions, the first connection portion being connected to the second magnetic pole surface, extending from the second magnetic pole surface in a third direction orthogonal to both the first direction and the second direction, and projecting to one side and another side in the third direction farther than each of the magnetic field generating member and the movable contact, and the pair of arm portions extending in the second direction from both end portions of the first connection portion along the third direction and being disposed on both sides of the magnetic field generating member and the movable contact along the third direction; and an auxiliary yoke directly connected to the first magnetic pole surface, wherein the auxiliary yoke includes: a second connection portion directly connected to the first magnetic pole surface; and a pair of extending portions extending farther than the first magnetic pole surface in the third direction from both end portions of the second connection portion along the third direction, and extending so as to approach the movable contact as advancing away from the second connection portion.

2. The switch according to claim 1, wherein a cross-sectional area of each of the extending portions is smaller than a cross-sectional area of each of the arm portions.

3. The switch according to claim 1, wherein a plate thickness of the auxiliary yoke is thinner than a plate thickness of the main yoke.

4. The switch according to claim 1, wherein a hole penetrating in the second direction is formed in the second connection portion.

5. The switch according to claim 1, wherein two of the fixed contacts are disposed apart from each other in the second direction, the movable contact includes two of the movable contact points, the movable contact points each being contactable with the fixed contact point of a corresponding one of the fixed contacts, two of the magnetic field generating members are disposed apart from each other in the second direction with the movable contact interposed in between, the main yoke is connected one to the second magnetic pole surface of each of the magnetic field generating members, and the auxiliary yoke is connected one to the first magnetic pole surface of each of the magnetic field generating members.

6. The switch according to claim 5, wherein, when a center of the movable contact point in the second direction is defined as a center of the movable contact point, the extending portions extend until a position of the extending portions in the second direction coincides with the center of the movable contact point.

7. The switch according to claim 5, comprising an insulating member separating the movable contact, the movable contact point, the fixed contact, and the fixed contact point from the magnetic field generating member, the main yoke, and the auxiliary yoke, in the second direction and the third direction.

8. The switch according to claim 7, wherein, when a center of the movable contact in the second direction is defined as a center of the movable contact, at least one separation wall extending in the third direction from the insulating member toward the movable contact is provided in a portion of the insulating member located between the extending portions and the center of the movable contact in the second direction.

9. The switch according to claim 8, wherein, when a center of the movable contact in the second direction is defined as a center of the movable contact, at least one insulating wall extending in the third direction from the insulating member toward the movable contact is provided in a portion of the insulating member coinciding with the center of the movable contact in the second direction.

10. The switch according to claim 7, wherein, when a center of the movable contact in the second direction is defined as a center of the movable contact, at least one insulating wall extending in the third direction from the insulating member toward the movable contact is provided in a portion of the insulating member coinciding with the center of the movable contact in the second direction.

* * * * *